(12) United States Patent
Nishi et al.

(10) Patent No.: US 7,889,621 B2
(45) Date of Patent: Feb. 15, 2011

(54) OBJECTIVE LENS DEVICE, OPTICAL PICKUP DEVICE, OPTICAL-DISC DRIVING DEVICE AND DRIVING METHOD OF OBJECTIVE LENS

(75) Inventors: Noriaki Nishi, Kanagawa (JP); Kenji Yamamoto, Kanagawa (JP); Takahiro Miyagi, Tokyo (JP); Fumiaki Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 656 days.

(21) Appl. No.: 11/871,420

(22) Filed: Oct. 12, 2007

(65) Prior Publication Data

US 2008/0279060 A1    Nov. 13, 2008

(30) Foreign Application Priority Data

May 8, 2007    (JP)    .............................. 2007-123081

(51) Int. Cl.
*G11B 7/00* (2006.01)
(52) U.S. Cl. ................................. 369/112.24
(58) Field of Classification Search ............ 369/112.24, 369/112.26
See application file for complete search history.

(56) References Cited

U.S. PATENT DOCUMENTS

| 5,898,651 | A  | * | 4/1999  | Furusawa   | ................. | 369/44.14 |
| 6,044,048 | A  | * | 3/2000  | Oinoue et al. | ............ | 369/44.23 |
| 6,188,528 | B1 | * | 2/2001  | Yamada et al. | .............. | 359/719 |
| 6,778,472 | B2 | * | 8/2004  | Nishikawa  | ............... | 369/44.21 |
| 7,352,517 | B2 | * | 4/2008  | Kimura     | ...................... | 359/719 |
| 2004/0114495 | A1 | * | 6/2004 | Kim et al. | .............. | 369/112.24 |
| 2005/0007906 | A1 |   | 1/2005 | Horinouchi et al. | | |
| 2005/0190663 | A1 | * | 9/2005 | Kim et al. | ................. | 369/44.15 |
| 2006/0002247 | A1 | * | 1/2006 | Kim et al. | ................. | 369/44.11 |
| 2006/0007812 | A1 | * | 1/2006 | Nishi et al. | ............... | 369/44.37 |
| 2007/0014205 | A1 | * | 1/2007 | Inui | ........................ | 369/44.14 |
| 2007/0047424 | A1 | * | 3/2007 | Wada et al. | ............ | 369/112.23 |
| 2007/0247982 | A1 | * | 10/2007 | Kawasaki et al. | ........ | 369/44.11 |
| 2007/0263522 | A1 | * | 11/2007 | Yamamoto et al. | ..... | 369/112.23 |

FOREIGN PATENT DOCUMENTS

| JP | 3438482      | 6/2003  |
| JP | 2004-318957  | 11/2004 |
| JP | 2005-100513  | 4/2005  |
| JP | 2005-293770  | 10/2005 |
| JP | 2005-302163  | 10/2005 |

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

An objective lens device includes: a first objective lens having a first numerical aperture, which can condense light into a disc-shaped first optical recording medium including a first cover layer of first thickness; a second objective lens having a second numerical aperture which is smaller than the first numerical aperture, which can condense light into a disc-shaped second optical recording medium including a second cover layer of second thickness which is thicker than the first thickness; a third objective lens having a third numerical aperture which is smaller than the second numerical aperture, which can condense light into a disc-shaped third optical recording medium including a third cover layer of third thickness which is thicker than the second thickness; and a lens holder configured to integrally hold the first, second, and third objective lenses.

21 Claims, 22 Drawing Sheets

FIG. 6

|  | φ (EFFECTIVE DIAMETER) [mm] | f (FOCAL LENGTH) [mm] | NA |
|---|---|---|---|
| OBJECTIVE LENS FOR CD | 1.8 | 1.765 (f3) | 0.51 |
| OBJECTIVE LENS FOR DVD | 1.8 | 1.385 (f2) | 0.65 |
| OBJECTIVE LENS FOR BD | 1.7 | 1.000 (f1) | 0.85 |

FIG. 7

|  | t (THICKNESS OF COVER LAYER) [mm] |
|---|---|
| CD | 1.2 (t3) |
| DVD | 0.6 (t2) |
| BD | 0.1 (t1) |

OBJECTIVE LENS DEVICE, OPTICAL PICKUP DEVICE, OPTICAL-DISC DRIVING DEVICE AND DRIVING METHOD OF OBJECTIVE LENS

CROSS REFERENCES TO RELATED APPLICATIONS

The present invention contains subject matter related to Japanese Patent Application JP 2007-123081 filed in the Japanese Patent Office on May 8, 2007, the entire contents of which are incorporated herein by reference.

BACKGROUND OF THE INVENTION

1. Field of the Invention

The present invention relates to an optical pickup device configured to perform at least one operation of optically recording a signal in an optical recording medium and playing a recorded signal, and an objective lens device to be implemented therein, and a driving method of an objective lens.

2. Description of the Related Art

Heretofore, there have been the following objective lenses, as an objective lens implemented in an optical pickup compatible with three formats of BD (Blu-ray Disc™, DVD (Digital Versatile Disc), and CD (Compact Disc) (e.g., see Japanese Unexamined Patent Application Publication No. 2005-302163 (paragraphs [0060] and [0061], and FIG. 7) and Japanese Unexamined Patent Application Publication No. 2005-293770 (paragraph [0038])).

With the optical pickup in Japanese Unexamined Patent Application Publication No. 2005-302163 (paragraphs [0060] and [0061], and FIG. 7), a first objective lens (24) configured to condense a laser beam of a wavelength of 400 through 410 nm into BD (100c), and a second objective lens (25) configured to condense a laser beam of a wavelength of 650 through 780 nm into CD (100b) or DVD (100a) are held in a movable block (12). With this Japanese Unexamined Patent Application Publication No. 2005-302163 (paragraphs [0060] and [0061], and FIG. 7), in order to realize reduction in thickness of a pickup, for example, as shown in FIG. 7, taking into consideration the working distance (WD) of each disc (100), i.e., the distance from each disc to an objective lens, the neutral position of the movable block (12) in the focusing direction is determined. This is because an objective lens compatible with CD and DVD is a two-wavelength compatible objective lens, and in this case, the focal length thereof is generally the same. It is needless to say that compatible objective lenses generally the same focal length. Regardless of the same focal length, the thickness of the cover layer of the disc surface differs between CD and DVD, so it is necessary to consider the neutral position of the working distance as described above. As a result thereof, with regard to each case of CD and DVD, the neutral position of focal stroke (position away from each disc by the working distance) differs. As a result thereof, the focal stroke in total (total stroke) that needs to be secured as optical pickup increases by an amount equivalent to the difference of the neutral position.

The "focal stroke" mentioned here means a range where an objective lens moves by driving of an actuator. With Japanese Unexamined Patent Application Publication No. 2005-302163 (paragraphs [0060] and [0061], and FIG. 7), in order to handle the three formats including BD, the neutral position of an objective lens compatible with BD is designed so as to be positioned in the center between the respective neutral positions of the above-mentioned CD and DVD. Thus, reduction in thickness in the focal direction thereof is realized.

On the other hand, with Japanese Unexamined Patent Application Publication No. 2005-293770 (paragraph [0038]), a three-wavelength compatible objective lens compatible with the above-mentioned three formats is employed.

SUMMARY OF THE INVENTION

With the optical pickup of Japanese Unexamined Patent Application Publication No. 2005-302163 (paragraphs [0060] and [0061], and FIG. 7), reduction in thickness is realized, but as described above, there is the difference of the working distance (ΔWD) caused by the neutral positions of CD and DVD differing, so excessive thickness remains accordingly.

Also, with Japanese Unexamined Patent Application Publication No. 2005-293770 (paragraph [0038]), the optical path length in the air equivalent to the difference of the thickness of each cover layer of BD, DVD, and CD (Δcover thickness/refractive index of cover layer) is consequently the difference of the focal stroke of a three-wavelength compatible objective lens (difference of neutral position). Accordingly, with this design, the stroke is long, defeating the goal of reduction in thickness.

Also, with Japanese Unexamined Patent Application Publication No. 2005-302163 (paragraphs [0060] and [0061], and FIG. 7), the focal length of a two-wavelength compatible objective lens is constant as described above, but NA (Numerical Aperture) differs for each laser beam employed for each of DVD and CD, so in the case of DVD of which the NA is greater than the NA of CD, the beam diameter becomes unnecessarily large. That is to say, the effective diameter of a laser beam for CD passing through the two-wavelength compatible objective lens differs from that of a laser beam for DVD. Particularly, like Japanese Unexamined Patent Application Publication No. 2005-293770 (paragraph [0038]), in the case of a three-wavelength compatible objective lens, in the case of BD having the greatest NA, the beam diameter further increases, and also the objective lens becomes extremely large. Consequently, the beam effective diameter necessary for the optical system becomes unnecessarily large as to DVD and BD of which the NA is greater, and in this point as well results in a configuration unsuitable for reduction in thickness.

It has been found desirable to provide an objective lens device, an optical pickup device, and an optical-disc driving device, whereby the recording mediums of different three types of format can be handled, and reduction in thickness can be realized, and also a driving method of the objective lens thereof.

An objective lens device according to an embodiment of the present invention includes a first objective lens having a first numerical aperture, which can condense light into a disc-shaped first optical recording medium including a first cover layer of first thickness, a second objective lens having a second numerical aperture which is smaller than the first numerical aperture, which can condense light into a disc-shaped second optical recording medium including a second cover layer of second thickness which is thicker than the first thickness, a third objective lens having a third numerical aperture which is smaller than the second numerical aperture, which can condense light into a disc-shaped third optical recording medium including a third cover layer of third thickness which is thicker than the second thickness, and a lens holder configured to integrally hold the first, second, and third objective lenses.

With the above configuration, there are provided the first, second, and third objective lenses compatible with the first, second, and third optical recording mediums, respectively. Accordingly, the lens holder can hold each objective lens by relatively changing the position in the focusing direction of each objective lens in accordance with the working distance of each objective lens. Each objective lens is held in the most appropriate position in the focusing direction, whereby an objective lens device subjected to further reduction in thickness, and reduction in the thickness of an optical pickup device in which that device is implemented, can be realized.

Also, the first, second, and third objective lenses are provided, whereby the problem of the lens becoming large as with existing compatible objective lenses, can be solved. This contributes to reduction in the thickness of the objective lens device. The expression "can condense light" means including a state in which a signal can be recorded or played.

The first objective lens includes a first focal length and a first lens principal point, the second objective lens includes a second focal length and a second lens principal point, the third objective lens includes a third focal length and a third lens principal point, the lens holder holds the second objective lens such that the second lens principal point is disposed at a position apart by distance equivalent to the difference (A–D) between a first focal length difference (A) which is the difference between the second focal length and the first focal length, and a first cover thickness difference converted into distance in the air (D) which is an optical path length in the air equivalent to the difference between the second thickness and the first thickness, and holds the third objective lens such that the third lens principal point is disposed at a position apart by distance equivalent to the difference (C–F) between a second focal length difference (C) which is the difference between the third focal length and the first focal length, and a second cover thickness difference converted into distance in the air (F) which is an optical path length in the air equivalent to the difference between the third thickness and the first thickness.

Thus, the initial position in the focusing direction of each objective lens (hereafter, referred to as "focal initial position" or "stroke center position") is fixed by the lens holder. That is to say, with regard to all of the respective objective lenses, the neutral positions described with Japanese Unexamined Patent Application Publication No. 2005-302163 (paragraphs [0060] and [0061], and FIG. 7), and Japanese Unexamined Patent Application Publication No. 2005-293770 (paragraph [0038]) are constant, and accordingly the difference of the neutral positions can be set to zero. Thus, reduction in the thickness of an objective lens device, and reduction in the thickness of an optical pickup device in which that device is implemented, can be realized.

A concept is set forth with relation to the present invention wherein, of a first cover layer, a second cover layer, and a third cover layer, the difference of the thicknesses of each two cover layers is converted into an optical path length in the air beforehand, and is set to the focal initial position of each objective lens. Accordingly, the difference of those is converted into distance in the air, which is referred to as "optical path length in the air".

The above-described arrangement is substantially the same as an arrangement wherein the lens holder holds the first objective lens such that the first lens principal point is disposed at a position apart by distance equivalent to the difference (A–D) between a first focal length difference (–A) which is the difference between the first focal length and the second focal length, and a first cover thickness difference converted into distance in the air (–D) which is an optical path length in the air equivalent to the difference between the first thickness and the second thickness, and holds the third objective lens such that the third lens principal point is disposed at a position apart by distance equivalent to the difference (B–E) between a third focal length difference (B) which is the difference between the third focal length and the second focal length, and a third cover thickness difference converted into distance in the air (E) which is an optical path length in the air equivalent to the difference between the third thickness and the second thickness. That is to say, the second lens principal point of the second objective lens is set as a reference position.

A case wherein the third lens principal point of the third objective lens is set as a reference position is also the same, and in this case, the lens holder holds the first objective lens such that the first lens principal point is disposed at a position apart by distance equivalent to the difference (F–C) between a second focal length difference (–C) which is the difference between the first focal length and the third focal length, and a second cover thickness difference converted into distance in the air (–F) which is an optical path length in the air equivalent to the difference between the first thickness and the third thickness, and holds the second objective lens such that the second lens principal point is disposed at a position apart by distance equivalent to the difference (E–B) between a third focal length difference (–B) which is the difference between the second focal length and the third focal length, and a third cover thickness difference converted into distance in the air (E) which is an optical path length in the air equivalent to the difference between the second thickness and the third thickness. With this configuration, at least two of the first, second, and third objective lenses are configured by integral molding. Thus, the interval of at least the two objective lenses can be reduced, whereby reduction in the size of an objective lens device can be realized. Also, at least the two objective lenses are configured by integral molding, thereby improving accuracy in the attachment positions and the tilts of at least the two objective lenses at the time of manufacturing an objective lens device. Particularly, the three of the first through third objective lenses are integrally molded, the advantages of which are marked.

According to an embodiment, the first numerical aperture is 0.8 through 0.9, the second numerical aperture is 0.6 through 0.7, and the third numerical aperture is 0.45 through 0.55. That is to say, description is made wherein the first optical recording medium is a BD, the second optical recording medium is a DVD or HD (High Definition) DVD, and the third optical recording medium is a CD.

With an embodiment of the present invention, when a mechanical vibration system including the first objective lens, second objective lens, third objective lens, and the lens holder resonates, the third objective lens is disposed at a position near the anti-node of vibration of the vibration system as compared with the first objective lens and the second objective lens. The greater the numerical aperture of an objective lens is, the shorter the focal length is, and the higher the recording density of an optical recording medium which is an object where light is condensed by the objective lens thereof is. The higher the recording density of an optical recording medium is, the higher accuracy is demanded regarding focus servo and tracking servo. Accordingly, an objective lens of which the numerical aperture is large is disposed in a position away from the anti-node of the above-mentioned vibration system so as to not be affected of the vibration system as much as possible, and the third objective lens of which the numerical aperture is the smallest is disposed in a position near the anti-node of the vibration system. Thus, recording errors or playback errors of signals can be prevented.

The resonance of the vibration system mentioned here means at least one of resonance in the focusing direction and resonance in the tracking direction.

The third objective lens may be disposed between the first objective lens and the second objective lens. With a vibration system including a lens holder, the center portion thereof frequently is the anti-node of resonance. Accordingly, recording errors or playback errors of signals can be prevented.

The lens holder may hold the first, second, and third objective lenses such that the necessary minimum stroke range of the second objective lens, with the necessary minimum stroke range of the first objective lens being included in the necessary minimum stroke range of the third objective lens.

The necessary minimum stroke means the distance equivalent to the amount of face blurring by which the corresponding optical recording medium is permitted. A n arrangement such as described above enables reduction in the thickness of an objective lens device, and reduction in the thickness of an optical pickup device in which the objective lens device is implanted, to be realized.

The working distance of the second objective lens and the third objective lens may be 0.2 through 0.5 mm.

The objective lens device may further include a protector, which is provided in the lens holder, configured to prevent the first, second, or third optical recording medium from coming into contact with at least one of the first, second, and third objective lenses.

The protector may be provided at the outer circumferential side in the radial direction of the first, second, or third optical recording medium in the lens holder. For example, an annular rib is provided at least in the inner circumferential portion of a CD. Accordingly, the rib can be prevented from coming into contact with the protector.

At least one of the first, second, and third objective lenses may include a self-aperture portion. Thus, it is unnecessary to obtain high positioning accuracy as compared with an existing case wherein an aperture is provided in a lens holder. Particularly, at least two of the first, second, and third objective lenses may be integral-type objective lenses which are integrally molded, and the integral-type objective lenses may include a self-aperture portion.

An optical pickup device according to an embodiment of the present invention includes a light source configured to emit a first laser beam including a first wavelength, a second laser beam including a second wavelength which is longer than the first wavelength, and a third laser beam including a third wavelength which is longer than the second wavelength, a first objective lens having a first numerical aperture, which can condense the first laser beam into a disc-shaped first optical recording medium including a first cover layer of first thickness, a second objective lens having a second numerical aperture which is smaller than the first numerical aperture, which can condense the second laser beam into a disc-shaped second optical recording medium including a second cover layer of second thickness which is thicker than the first thickness, a third objective lens having a third numerical aperture which is smaller than the second numerical aperture, which can condense the third laser beam into a disc-shaped third optical recording medium including a third cover layer of third thickness which is thicker than the second thickness, a lens holder configured to integrally hold the first, second, and third objective lenses, and an actuator configured to drive the lens holder.

The "light source" may be separate light sources which emit each laser beam, or may be a light source wherein the light sources of at least two laser beams of the three laser beams are physically configured as one structure. The "first wavelength" is, for example, 400 through 410 nm, "second wavelength" is, for example, 650 through 660 nm, and "third wavelength" is, for example, 770 through 830 nm, but the wavelengths are not restricted to these ranges.

The "actuator" is a driving mechanism configured to drive the lens holder to drive each objective lens at least in the tracking direction and in the focusing direction to record or play a signal. As for the actuator, for example, an actuator may be employed, which is driven by driving principles, such as an electromagnetism operation, an electrostatic operation, a piezoelectric operation, or the like.

When assuming that the difference between the stroke center positions of the first and second objective lenses in the focusing direction is $\Delta ST1$, and the optical path length in the air equivalent to the difference between the first thickness and the second thickness is $L1$, which is driven by the actuator, the lens holder may hold the first and second objective lenses so as to satisfy $\Delta ST1 < L1$. Alternatively, when assuming that the difference between the stroke center positions of the second and third objective lenses in the focusing direction is $\Delta ST2$, and the optical path length in the air equivalent to the difference between the second thickness and the third thickness is $L2$, which is driven by the actuator, the lens holder may hold the second and third objective lenses so as to satisfy $\Delta ST2 < L2$. Alternatively, when assuming that the difference between the stroke center positions of the third and first objective lenses in the focusing direction is $\Delta ST3$, and the optical path length in the air equivalent to the difference between the third thickness and the first thickness is $L3$, which is driven by the actuator, the lens holder may hold the third and first objective lenses so as to satisfy $\Delta ST3 < L3$.

The optical pickup device may further include a mirror, which is a plate shaped or triangular-prism shaped, and disposed so as to face the first objective lens, configured to reflect the first beam so as to enter the first laser beam emitted from the light source into the first objective lens. With the first objective lens of which the numerical aperture is the greatest, in order to realize a large numerical aperture, it is necessary to employ a lens having large power, so the thickness in the focusing direction becomes thick unless a special lens is employed. In this case, in the event that the mirror is a plate shape or a triangular prism shape, the space in the focusing direction of the first objective lens can be secured, and accordingly, the first objective lens can be disposed in an appropriate position even if the thickness of the first objective lens is thick. In this case, a mirror which allows a laser beam to enter in the second and third objective lenses may be a plate shape or rectangular prism shape, or may be realized with a later-described quadrangular prism or the like.

The optical pickup device may further include a first dichroic mirror, which is disposed so as to face the second objective lens, configured to transmit the first laser beam, of the first laser beam and the second laser beam, and reflect the second laser beam so as to enter the second laser beam into the second objective lens, and a second dichroic mirror, which is disposed so as to face the third objective lens, configured to transmit the first and second laser beams, of the first, second, and third laser beams, and reflect the third laser beam so as to enter the third laser beam into the third objective lens. Thus, an objective lens device in a state wherein the first, second, and third objective lenses are arrayed in one row can be realized.

The optical pickup device may further include a prism including the first dichroic mirror and the second dichroic mirror, and a wavelength plate, which is provided in the prism, configured to change the polarization states of the first, second, and third laser beams. Particularly, the wavelength plate of the third laser beam is provided in the prism, which eliminates the necessity to provide a wavelength plate in the vicinity of the mirror which reflects the first laser beam. That is to say, for example, there is no need to secure the space of the wavelength plate for the first laser beam in the vicinity of the first objective lens, which contributes to reduction in the thickness of an optical pickup device.

An optical-disc driving device according to an embodiment of the present invention includes a rotational driving mechanism configured to rotationally drive a disc-shaped first optical recording medium including a first cover layer of first thickness, a disc-shaped second optical recording medium including a second cover layer of second thickness which is thicker than the first thickness, or a disc-shaped third optical recording medium including a third cover layer of third thickness which is thicker than the second thickness, a first objective lens including a first numerical aperture, which can condense light into the first optical medium, a second objective lens including a second numerical aperture which is smaller than the first numerical aperture, which can condense light into the second optical recording medium, a third objective lens including a third numerical aperture which is smaller than the second numerical aperture, which can condense light into the third optical recording medium, a lens holder configured to hold the first, second, and third objective lenses integrally, an actuator configured to drive the lens holder, and a recording/playback processing unit configured to record a signal in the first, second, or third optical recording medium which is rotationally driven by the rotational driving mechanism, or to play a signal recorded therefrom. The "recording/playback processing unit" means a member, a function, a processing circuit, or the like which is necessary for recording or playing a signal.

An objective lens driving method according to an embodiment of the present invention includes the steps of: condensing light into a disc shaped optical recording medium including a first cover layer of first thickness using a first objective lens including a first numerical aperture, condensing light into a disc-shaped second optical recording medium including a second cover layer of second thickness which is thicker than the first thickness, using a second objective lens including a second numerical aperture which is smaller than the first numerical aperture, condensing light into a disc-shaped third optical recording medium including a third cover layer of third thickness which is thicker than the second thickness using a third objective lens having a third numerical aperture which is smaller than the second numerical aperture, and driving a lens holder configured to integrally hold the first, second, and third objective lenses to record or play a signal.

As described above, according to embodiments of the present invention, three formats of recording medium can be handled, and reduction in thickness can be realized.

BRIEF DESCRIPTION OF THE DRAWINGS

FIG. 6 is a table showing the φ (effective diameter), f (focal length), and NA of each of objective lenses for CD, DVD, and BD according to the present embodiment;

FIG. 7 is a table showing the thickness of each cover layer of CD, DVD, and BD;

DESCRIPTION OF THE PREFERRED EMBODIMENTS

Embodiments of the present invention will be described below with reference to the drawings.

Figure 1:
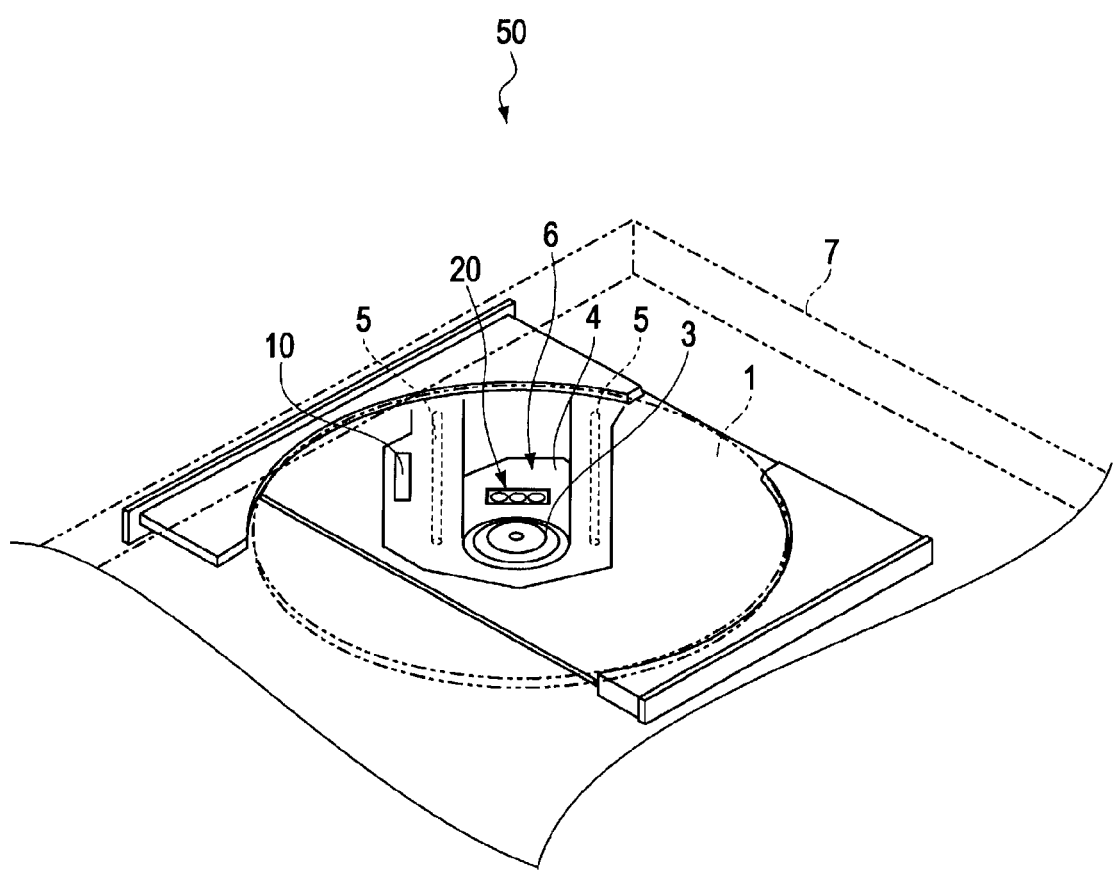
FIG. 1 is a schematic perspective view of an optical-disc driving device according to one embodiment of the present invention.
Figure 2:
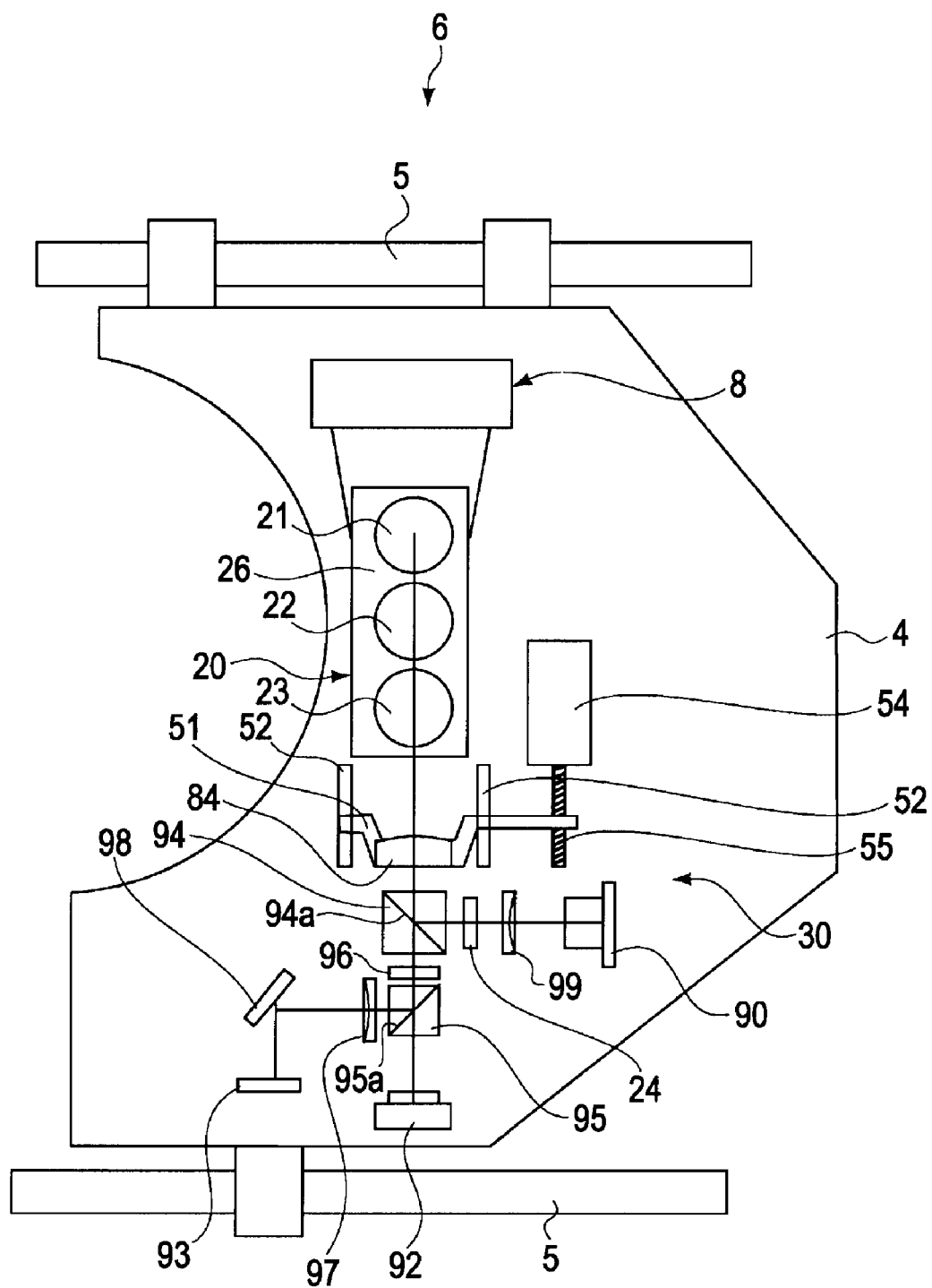
FIG. 2 is a schematic plan view illustrating an optical pickup device implemented in the optical-disc driving device in FIG. 1.

FIG. 1 is a schematic perspective view of an optical-disc driving device according to one embodiment of the present invention. FIG. 2 is a schematic plan view illustrating an optical pickup device implemented in the optical-disc driving device 50 in FIG. 1.

The optical-disc driving device 50 is a device configured to subject an optical disc (CD, CD-ROM, CD-R/RW, DVD, DVD-ROM, DVD±R/RW, DVD-RAM, BD, BD-ROM, BD-R/RE, HD DVD, etc.) 1 serving as an optical recording medium to recording/playback of information. The optical disc 1 may include a single signal recording layer, or may include multiple signal recording layers. Hereafter, the optical disc 1 will in some cases be referred to as "BD100", "DVD200", or CD300, and in some cases these three optical discs (or four optical discs including an optical disc such as HD DVD or the like) will be collectively referred to as an "optical disc 1" for the sake of simplicity.

The optical-disc driving device 50 includes, for example, a disc damper 3 where the optical disc 1 is mounted, an optical pickup device 6 in which a later-described optical system and so forth are implemented, and a casing 7 configured to accommodate these.

The disc damper 3 is provided with a chucking mechanism configured to hold the optical disc 1. According to the chucking mechanism, an arrangement is made wherein the optical disc 1 is mounted on the disc damper 3, whereby the optical disc 1 can be rotated.

The optical pickup device 6 includes a moving base 4, an optical system 30 mounted on this moving base 4, and an actuator 8 configured to drive a later-described condensing device (objective lens device) 20. The moving base 4 is connected to the rotating shaft of a feed motor not shown in FIG. 2, and is slidable in the radial direction of the optical disc 1 along guide shafts 5 provided on both ends. The direction to which the moving base 4 moves is generally called a radial direction. Also, the direction orthogonal to the radial direction is generally called a tangential direction. The actuator 8 is a biaxial actuator configured to displace the objective lens device 20 in the focusing direction and in the tracking direction to perform control of drive such as focus servo, tracking servo, or the like. However, the actuator is not necessarily restricted to the case of a biaxial actuator, so a triaxial actuator may be provided wherein the objective lens device 20 can be displaced even in the relative inclination angle (tilt angle) direction between the objective lens device 20 and the optical disc 1.

Figure 3:
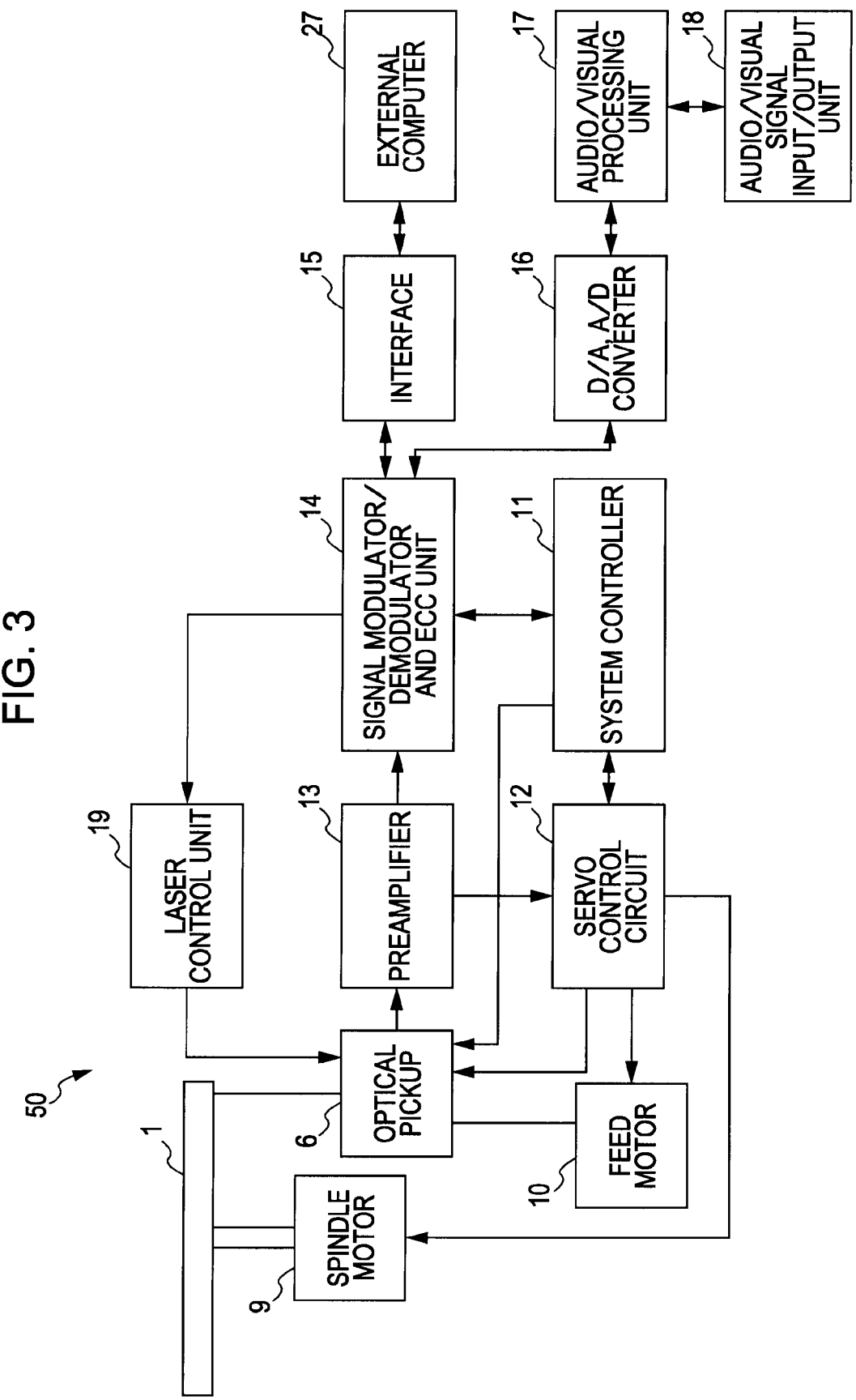
FIG. 3 is a block diagram illustrating the configuration of the optical-disc driving device shown in FIG. 1.

FIG. 3 is a block diagram illustrating the configuration of the optical-disc driving device 50 shown in FIG. 1. In addition to the optical pickup device 6, the optical-disc driving device 50 further includes, as shown in FIG. 2, a spindle motor 9, a feed motor 10, a system controller 11, a servo control circuit 12, a preamplifier 13, a signal modulator/demodulator and ECC (error correction code) unit 14, an interface 15, D/A converter and A/D converter 16, an audio/visual processing unit 17, an audio/visual signal input/output unit 18, and a laser control unit 19.

The spindle motor 9 is a motor configured to rotationally drive the optical disc 1. The disc damper 3 and the spindle motor 9 make up a rotary drive mechanism.

The feed motor 10 is a motor configured to move the moving base 4 shown in FIG. 1 in the radial direction of the optical disc 1. Thus, the optical pickup device 6 is moved in the radial direction of the optical disc 1.

The system controller 11 is provided to perform individual control such as the overall of the optical-disc driving device 50, signal processing, servo control, and so forth.

The servo control circuit 12 generates a focal servo signal and a tracking servo signal based on the signals obtained from the preamplifier 13 (focal error signal and tracking error signal), and transmits these signals to the optical pickup device 6 and the feed motor 10.

The preamplifier 13 generates a focal error signal (tracking error signal and RF signal) from the signal obtained from the optical pickup device 6.

The signal modulator/demodulator and ECC (error correction code) unit 14 demodulates an RF signal, and a recording signal, and also performs error correction coding processing. For example, the signal modulator/demodulator and ECC unit 14 adds an ECC to a recording signal, and performs error correction regarding a signal to be played (RF signal).

The interface 15 performs exchange of a signal with the external computer 27. The D/A converter and A/D converter 16 converts a playback signal from a digital signal to an analog signal, and also converts a recording signal from an analog signal to a digital signal.

The audio/visual processing unit 17 and the audio/visual signal input/output unit 18 perform exchange of an audio signal or a picture signal with an external device. The laser control unit 19 controls the output and wavelength of a semiconductor laser implemented in the optical pickup device 6 depending on recording or playback, the type of optical disc 1, and so forth.

The optical-disc driving device 50 configured as described above subjects the optical disc 1 to rotation operation using the spindle motor 9, and subjects the feed motor 10 to control of drive depending on the control signal from the servo control circuit 12. Thus, the optical-disc driving device 50 moves the optical pickup device 6 to a position corresponding to a desired recording track of the signal recording layer selected of the optical disc 1, thereby performing recording/playback of information as to the signal recording layer selected of the optical disc 1.

As shown in FIG. 2, the optical system 30 includes a one-wavelength laser diode 90, a laser coupler 92, a photodetector 93, a first adjusting lens 99, a λ/2 plate 96, a first polarization beam splitter 94, a second polarization beam splitter 95, a second adjusting lens 97, a mirror 98, a grating 24, a collimator lens 84, and an objective lens device 20.

The one-wavelength laser diode 90 emits a laser beam of a wavelength of 400 through 410 nm compatible with BD100 (hereafter, referred to as a first laser beam). The laser coupler 92 emits a laser beam of a wavelength of 650 through 660 nm compatible with DVD200 (hereafter, referred to as a second laser beam) and a laser beam of a wavelength of 770 through 830 nm compatible with CD300 (hereafter, referred to as a third laser beam), and also implements a light receiving element configured to receive these second and third laser beams.

The photodetector 93 detects the return beam from the optical disc 1 of the first laser beam. The second adjusting lens 97 performs adjustment of a beam diameter and so forth such that the photodetector 93 suitably detects the relevant return beam. The mirror 98 guides the first laser beam emitted from the second adjusting lens 97 to the photodetector 93.

The collimator lens 84 converts the laser beam of each wavelength transmitted or reflected from the first polarization beam splitter 94 into a parallel beam. The collimator lens 84 is supported by a lens holder 51, and also both ends of the lens holder 51 are supported by a pair of guide shafts 52 extended in the optical axis direction. Also, the lens holder 51 is configured so as to be moved in the optical axis direction by being engaged with the lead screw 55 of a drive motor 54. The lens holder 51 is moved in the optical axis direction by the lead screw 55 of the drive motor 54 being moved rotationally, whereby the collimator lens 84 can correct a spherical aberration caused by the thickness error of a surface cover layer, and the difference between the surface cover layers of a multi-layer disc, and also can set the collimator position most appropriate for each laser beam employed for recording/playback of which the wavelength differs depending on the format of the optical disc 1.

Figure 4:
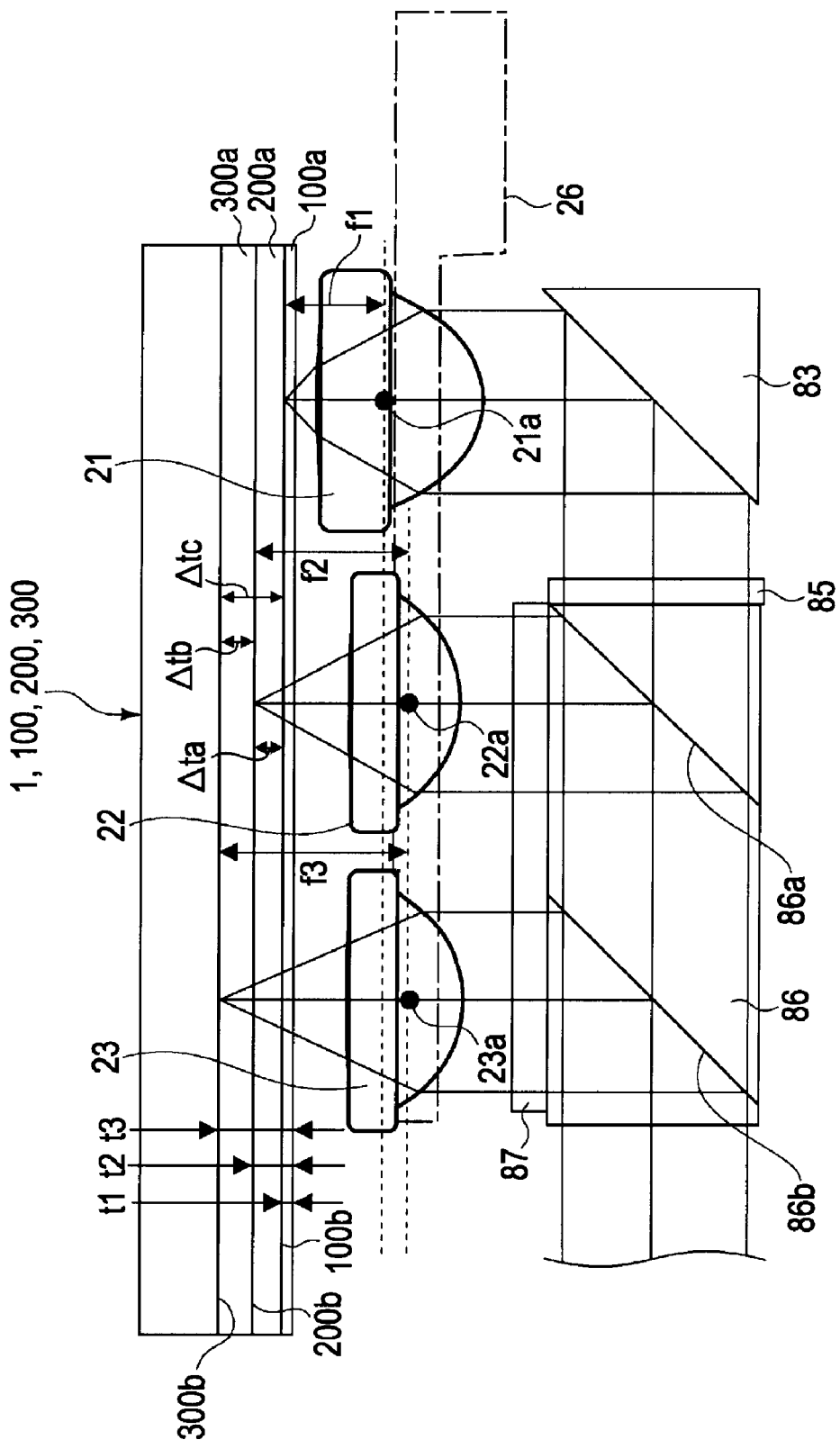
FIG. 4 is a side view of an objective lens device included in an optical system of the optical pickup device shown in FIG. 3.

FIG. 4 is a side view of the objective lens device included in the optical system 30 of the optical pickup device 6 shown in FIG. 2. The optical system 30 further includes a raising prism 86, a raising mirror 83, a first λ/4 plate 87, and a second λ/4 plate 85.

The raising prism 86 transmits the first laser beam which has been transmitted through the collimator lens 84, and also raises the second and third laser beams which have been transmitted through the collimator lens 84 toward the optical disc 1 side. That is to say, the raising prism 86 reflects the second and third laser beams such that the second and third laser beams enter in an objective lens 22 for DVD and an objective lens 23 for CD. The raising mirror 83 raises the first laser beam which has been transmitted through the collimator lens 84 and the raising prism 86 toward the optical disc 1 side, and reflects the first laser beam such that the first laser beam enters in the objective lens 21 for BD.

Figure 21:
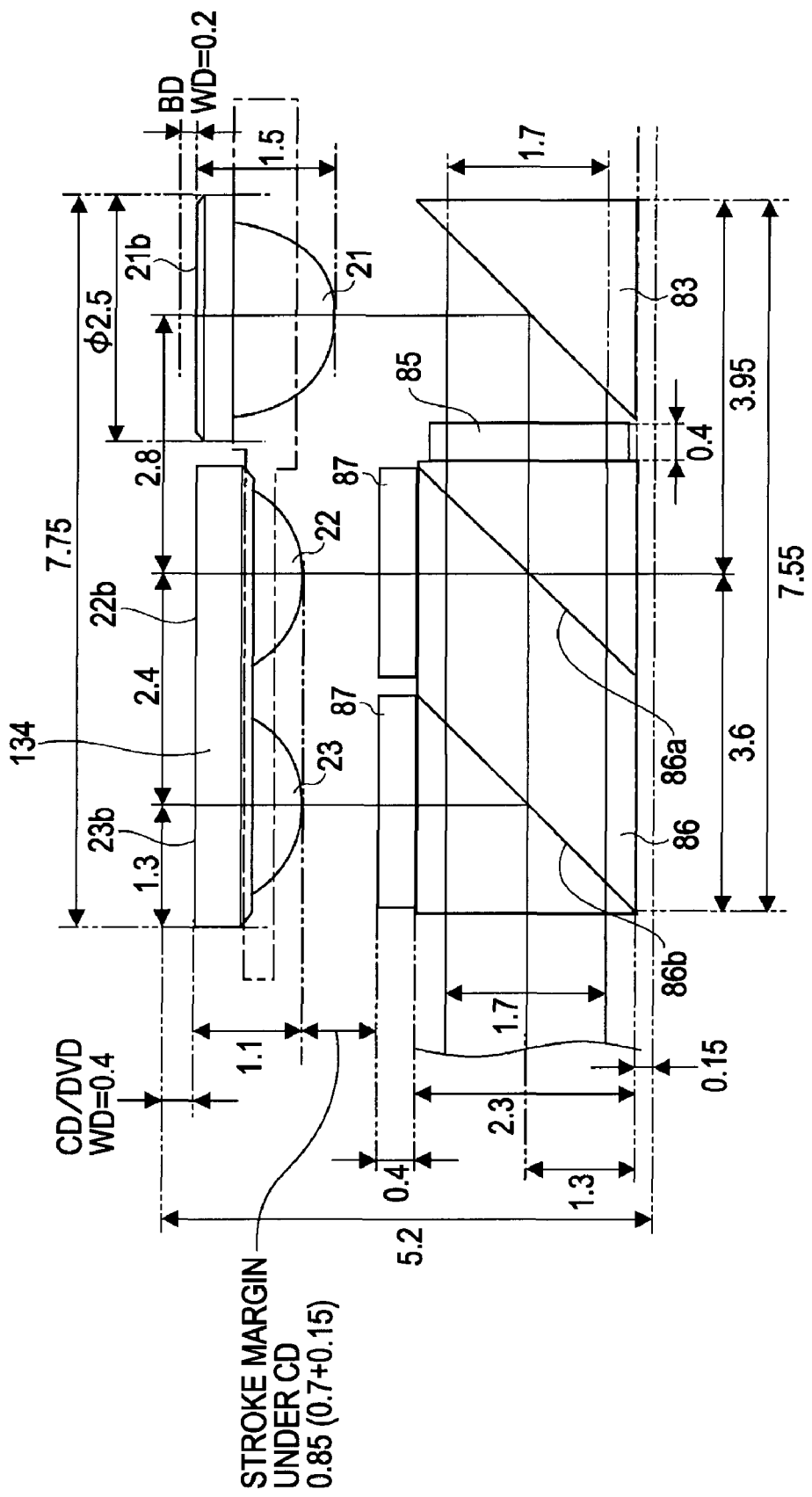
FIG. 21 is a diagram illustrating another embodiment of an objective lens device wherein an objective lens for CD and an objective lens for DVD such as shown in FIGS. 8 and 9 are integrally molded.

The first λ/4 plate 87 converts the polarization direction of the second and third laser beams raised by the raising prism 86 from linear polarization to circular polarization. The first λ/4 plate 87 is an integral type for CD and for DVD, but instead of an integral type, for example, may be individually provided such as shown in FIG. 21. The second λ/4 plate 85 similarly converts the polarization direction of the first laser beam which has been transmitted through the raising prism 86 from linear polarization to circular polarization.

Note that the raising prism 86 includes a separation membrane having wavelength dependency, which includes the membrane properties of reflection and transmission depending on the order of corresponding objective lenses. However, as described later, in the event that the objective lens 22 for DVD is employed as an objective lens for HD DVD, the wavelength of a laser beam for BD and the wavelength of a laser beam for HD DVD are the same, so it is desirable to set the ratio of the reflection and transmission of the separation membrane appropriately.

With the one-wavelength laser diode 90, the first laser beam is emitted to the first polarization beam splitter 94 from the light emitting portion. The laser beam emitted from the one-wavelength laser diode 90 is rotated by the grating 24 also serving as a λ/2 plate function as to the first laser beam such that the polarization direction becomes generally S polarization as to the first polarization beam splitter 94. The first laser beam is divided into three beams configured to generate a tracking error signal using the differential push pull method by the grating 24, following which the beams are entered in the first polarization beam splitter 94.

Here, the objective lens position is offset in the tangential direction from the center of the spindle motor 3, and thus, the phase of a push pull signal is shifted due to each of the primary and sub spots in the differential push pull method. An arrangement may be made wherein the grating 24 generates astigmatism in a 45-degree direction at the sub spot, thereby suppressing the amplitude of a push pull signal caused by the sub spot.

Figure 5:
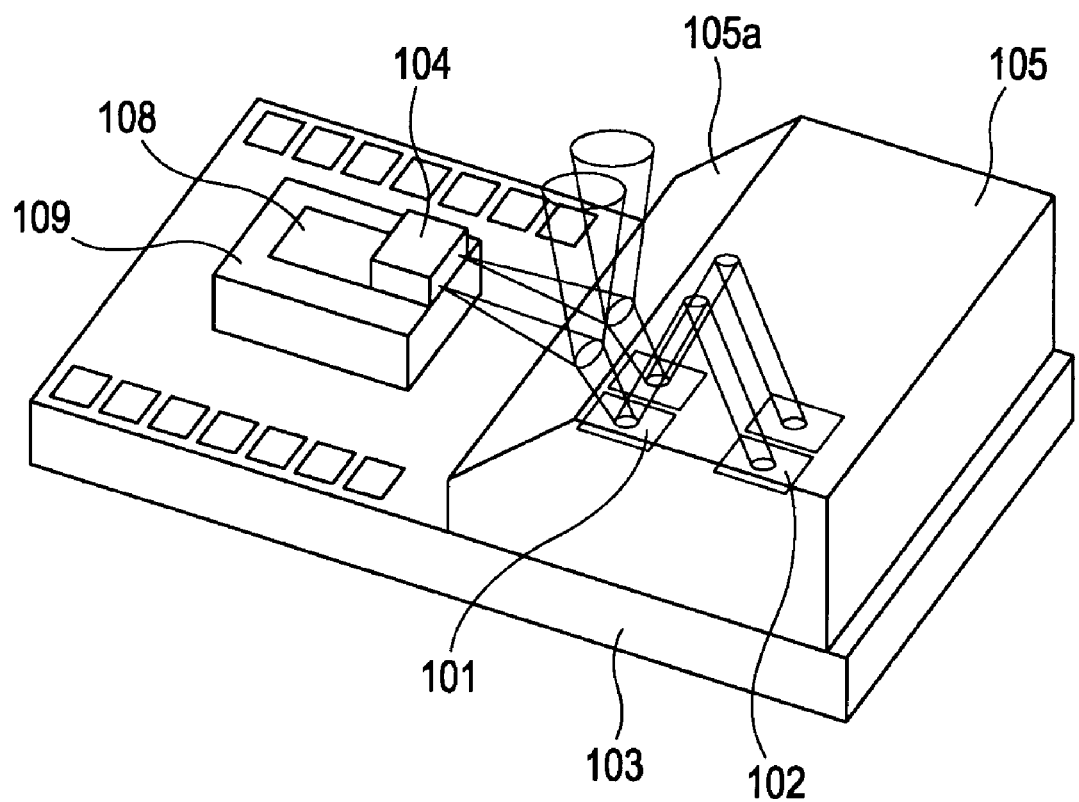
FIG. 5 is a perspective view of a laser coupler.

FIG. 5 is a perspective view of the laser coupler 92. Note that in FIG. 5, the illustrations of members such as a package covering the laser coupler 92 and so forth are omitted. The laser coupler 92 includes, for example, a silicon chip 103 where photodetectors 101 and 102 configured to detect the return beams of the second and third laser beams are provided on a surface region. A photodiode chip 109 is mounted on the silicon chip 103, and a two-wavelength laser diode 104 is mounted on the photodiode chip 109.

The two-wavelength laser diode 104, in the case of playback dedicated, is usually attached to the silicon chip 103 via the photodiode chip 109 where a PIN photodiode 108 is provided on the surface region. The PIN photodiode 108 provided on the photodiode chip 109 monitors the laser beam emitted from the rear surface of the two-wavelength laser diode 104 for the sake of controlling the output of the two-wavelength laser diode 104.

In the case of recording/playback use, an unshown photodetector for laser power monitor provided on the silicon chip 103 is employed. This photodetector is equivalent to a light receiving unit for monitor (27) such as described in FIGS. 2, 7, 9, and so forth in Japanese Patent No. 3438482. According to such a photodetector for laser power monitor, of the laser beams emitted from the front surface of the two-wavelength laser diode 104, components not employed for condensing light into the optical disc 1 (e.g., components which have been transmitted through a prism 105, etc.) are monitored.

The prism 105 having an inclined end face 105a which reflects the second and third laser beams emitted from the two-wavelength laser diode 104 almost right-angled is mounted on the silicon chip 103. The laser beam reflected at the inclined end face 105a proceeds to the second polarization beam splitter 95. On the other hand, the return beam reflected at the signal recording surface of the optical disc 1 transmits the inclined end face 105a of the prism 105, passes through the prism 105, and is detected by the photodetectors 101 and 102 as described above.

Description will be made with reference to FIG. 2 regarding a wavelength selection function which the first and second polarization beam splitters 94 and 95 each include. That is to say, the first and second polarization beam splitters 94 and 95 are elements which transmit or reflect an incident laser beam depending on its wavelength, which are configured by an optical thin membrane having a predetermined configuration being provided on the bonded surfaces 94a and 95a of the prism. Thus, the first polarization beam splitter 94 transmits the second and third laser beams regardless of the polarization states thereof, and also transmits and reflects the first laser beam depending on its polarization. Also, the second polarization beam splitter 95 similarly transmits the second and third laser beams regardless of the polarization states thereof, and also transmits and reflects the first laser beam depending on its polarization state.

More specifically, when the incident angle of the return light of the first laser beam, which has been emitted from the one-wavelength laser diode 90, and converted into S polarization by the grating 24, is a design central value, the first polarization beam splitter 94 reflects all of the beam quantity toward the collimator lens 84 side by the bonded surface 94a. Also, when the incident angle of the first laser beam, which has been reflected at the signal recording surface of the optical disc 1, and converted into P polarization by the second λ/4 plate 85, is a design central value, the first polarization beam splitter 94 transmits all of the beam quantity toward the second polarization beam splitter 95 side.

The above-mentioned λ/2 plate 96 is provided between the first polarization beam splitter 94 and the second polarization beam splitter 95. Accordingly, the return beam of the first beam which has been transmitted through the first polarization beam splitter 94, and converted into P polarization, is converted into S polarization again, and entered in the second polarization beam splitter 95. When the incident angle of the first laser beam converted into S polarization is a design central value, the second polarization beam splitter 95 reflects all of the beam quantity at the bonded surface 95a in the same way as the first polarization beam splitter 94. The return beam reflected at the bonded surface 95a is entered in the light receiving face of the photodetector 93 via the second adjusting lens 97 and the mirror 98.

The objective lens device 20 includes an objective lens 21 for BD configured to converge the first laser beam on the signal recording surface of the optical disc 1, an objective lens 22 for DVD configured to converge the second laser beam on the signal recording surface of the optical disc 1, an objective lens 23 for CD configured to converge the third laser beam on the signal recording surface of the optical disc 1, and a lens holder 26 integrally holding the objective lenses 21, 22, and 23 for BD, DVD, and CD. The lens holder 26 is preferably made up of a resin, but may be metal of which the specific gravity is light, such as aluminum or the like, or may be another material other than those.

Thus, the objective lenses 21, 22, and 23 for BD, DVD, and CD which are compatible with three disc formats are provided individually, whereby each of the objective lenses 21, 22, and 23 can be held by the lens holder 26 by relatively changing the position in the focusing direction of each of the objective lenses 21, 22, and 23 in accordance with the working distance each of the objective lenses 21, 22, and 23. Subsequently, each of the objective lenses 21, 22, and 23 is held in its most appropriate position in the focusing direction, whereby an objective lens device of which the thickness is reduced further can be realized. The most appropriate holding position of each of the objective lenses 21, 22, and 23 will be described later.

Also, the objective lenses 21, 22, and 23 for BD, DVD, and CD are provided individually, whereby the problem of a lens becoming large, such as with existing compatible objective lenses, can be solved. This contributes to reduction in the thickness of an objective lens device. Description will be made later regarding this.

Also, with the present embodiment, lens design can be made individually regarding the objective lenses 21, 22, and 23 for BD, DVD, and CD. For example, an aberration can be considered individually regarding each of the objective lenses 21, 22, and 23, and accordingly, lens design the most appropriate for the respective laser beams having different three wavelengths can be performed.

The raising mirror 83 is a prism-shaped mirror made up of a triangular prism, and disposed so as to face the objective lens 21 for BD. With the objective lens 21 for BD of which the numerical aperture is the greatest, in order to realize a large numerical aperture, it is necessary to employ a lens having large power, so the thickness in the focusing direction becomes thick unless a special lens is employed. In this case, in the event that the raising mirror 8 has a triangular prism shape, the space in the focusing direction of the objective lens 21 for BD can be secured, and accordingly, the objective lens 21 for BD can be disposed in an appropriate position even if its thickness is thick. It is needless to say that the raising mirror 83 may have a plate shape from the above-mentioned meanings.

The raising prism 86 typically includes a first dichroic mirror 86a and a second dichroic mirror 86b, which serve as the above-mentioned separation membranes. The first dichroic mirror 86a is disposed so as to face the objective lens 22 for DVD, and of the first and second laser beams, transmits the first laser beam, and reflects the second laser beam so as to enter the second laser beam into the objective lens 22 for DVD. Also, the second dichroic mirror 86b is disposed so as to face the objective lens 23 for CD, and of the first, second, and third laser beams, transmits the first and second laser beams, and reflects the third laser beam so as to enter the third laser beam into the objective lens 23 for CD.

As described above, with the raising prism 86, the first λ/4 plate 87 and the second λ/4 plate 85 are provided as wavelength plates. Particularly, the second λ/4 plate 85 serving as a wavelength plate for the third laser beam is provided in the raising prism 86, which eliminates the necessity to provide a wavelength plate near the raising mirror 83. That is to say, for example, there is no need to secure the space for the second λ/4 plate 85 near the objective lens 21 for BD, thereby contributing to reduction in the thickness of the optical pickup device 6.

With the optical system 30 such as described above, the first laser beam emitted from the one-wavelength laser diode 90, following the outward scale factor being adjusted via the coupling lens 99, is emitted with the polarization direction being rotated by the λ/2 plate function of the grating 24, whereby the S polarization components are reflected at the bonded surface 94a of the first polarization beam splitter 94, and also a part of the P polarization components are transmitted, and the amount of the laser beam is monitored by an unshown light receiving element for laser power monitor. The reflected first laser beam passes through the collimator lens 84 by which the spherical aberration of BD100 can be eliminated in a combination of the objective lens 21 by performing positional adjustment, and further passes through the objective lens 21 for BD, and converges on the signal recording surface 100b via the cover layer 100a of BD100. Also, the return beam of the laser beam reflected at the signal recording surface 100b of BD100, of which the polarization direction is converted into a direction orthogonal to the outward trip by the λ/4 plate 85, is entered in a P polarization state into the first polarization beam splitter 94, and transmits all of the beam quantity. The return beam of the first laser beam regarding which all of the beam quantity has been transmitted, of which the polarization direction is converted into an orthogonal direction by the λ/2 plate 96 provided immediately before the second polarization beam splitter 95, and is entered in a S polarization state, whereby all of the beam quantity is reflected at the bonded surface 95a of the second polarization beam splitter 95, and converged on the light receiving face of the photodetector 93.

Also, with the second or third laser beam emitted from the laser coupler 92, all of the beam quantity is transmitted through the second polarization beam splitter 95, λ/2 plate 96, and first polarization beam splitter 94. The second or third laser beam of which all of the beam quantity has been transmitted passes through the collimator lens 84 which is set so as to become the most appropriate position as to DVD200 or CD300 depending on the light emitting point and wavelength thereof, passes through the objective lens 22 for DVD and the objective lens 23 for CD, and converges on the signal recording surface 200b or 300b via the cover layer 200a or 300a of DVD200 or CD300. Also, the return beam of the second or third laser beam reflected at the signal recording surface 200b or 300b of DVD200 or CD300 returns the same optical path as the outward trip, enters in the laser coupler 92, and is transmitted through the inclined end face 105a of the prism 105, and converges on the photodetectors 101 and 102.

Note that with the present embodiment, the differential push pull method has been cited as an example of a tracking servo method, but another known method may be employed. With the above-mentioned optical system 30, an arrangement has been made wherein only the first laser beam is selectively transmitted or reflected, but for example, an arrangement may be made wherein according to a configuration of a light source, a photodetector, and the polarization separation membranes of the first and second polarization beam splitters 94 and 95 (bonded surfaces 94a and 95a), only the second laser beam is selectively transmitted or reflected.

FIG. 6 is a table showing the φ (effective diameter) (mm), f (focal length) (mm), and NA of each of the objective lens 23 for CD, objective lens 22 for DVD, and objective lens 21 for BD according to the present embodiment. FIG. 7 is a table showing the t (thickness) (mm) of each of cover layers 300a, 200a, and 100a of CD300, DVD200, and BD100. With regard to φ and f, the values of the table are mere exemplifications, which vary depending on the design of size of objective lens. With regard to CD, in the case of playback dedicated, NA is commonly within a range of 0.45 through 0.50 or so, and in the case of recording/playback use, NA is commonly within a range of 0.50 through 0.55 or so. With regard to DVD, in the case of playback dedicated, NA is commonly within a range of 0.60 through 0.65 or so, and in the case of recording/playback use, NA is commonly within a range of 0.65 through 0.70 or so. With regard to BD, NA is commonly 0.85 or so at present, but it can be thought that as with CD and DVD, an appropriate NA will be in the future selected within a range of 0.80 through 0.90 or so taking into consideration various conditions. With regard to t also, the values in this table are standard values, so in the event of irregularities and a multi-layer disc and so forth, the values to be employed are different from these values. Hereafter, let us say that the thickness of the cover layer of BD is t1, the thickness of the cover layer of DVD is t2, and the thickness of the cover layer of CD is t3 (see FIG. 4).

As shown in FIG. 4, let us say that the principal points of the objective lenses 21, 22, and 23 for BD, DVD, and CD are a first lens principal point 21a, a second lens principal point 22a, and a third lens principal point 23a, respectively. The lens principal point mentioned here means the optical center of a lens, and the center point determines a focal length f. Also, the objective lenses 21, 22, and 23 for BD, DVD, and CD have a first focal length f1, a second focal length f2, and a third focal length f3, respectively.

Now, let us say that the difference between the first focal length f1 and the second focal length f2 is $$\Delta fa(=f2-f1),$$

the difference between the second focal length f2 and the third focal length f3 is $$\Delta fb(=f3-f2),$$

and the difference between the third focal length f3 and the first focal length f1 is $$\Delta fc(=f3-f1).$$

Also, the difference between the thickness of the cover layer 100a of BD100 and the thickness of the cover layer 200a of DVD200 is $$\Delta ta(=t2-t1),$$

the difference between the thickness of the cover layer 200a of DVD200 and the thickness of the cover layer 300a of CD300 is $$\Delta tb(=t3-t2),$$

and the difference between the thickness of the cover layer 300a of CD300 and the thickness of the cover layer 100a of BD100 is $$\Delta tc(=t3-t1).$$

With the example shown in FIG. 6, Δfa=0.385, Δfb=0.380, and Δfc=0.765. Also, Δta=0.5, Δtb=0.6, and Δtc=1.1.

Subsequently, the optical path difference L1 of a laser beam in the air equivalent to Δta, the optical path difference L2 of a laser beam in the air equivalent to Δtb, and the optical path difference L3 of a laser beam in the air equivalent to Δtc can be represented with the following expressions, respectively.

$$L1=\Delta ta/\text{refractive index of cover layer} \quad (1)$$

$$L2=\Delta tb/\text{refractive index of cover layer} \quad (2)$$

$$L3=\Delta tc/\text{refractive index of cover layer} \quad (3)$$

In the event that the cover layers of BD100, DVD200, and CD300 are, for example, polycarbonate resins, the refractive index thereof is around 1.6. With the example shown in FIG. 6, $$L1=0.5/1.6 \text{ approximately equal to } 0.31 \quad (4)$$

$$L2=0.6/1.6 \text{ approximately equal to } 0.38 \quad (5)$$

$$L3=1.1/1.6 \text{ approximately equal to } 0.69 \quad (6)$$

are obtained.

In the event that another cover layers other than polycarbonate are employed for the objective lenses 21, 22, and 23 for BD, DVD, and CD, and also the refractive index differs from the above-mentioned value, it is needless to say that the values of L1, L2, and L3 differ from the above-mentioned values.

The reason to convert an optical path length into the air is because an arrangement is the concept of the present embodiment wherein the thickness difference of the respective cover layers 100a, 200a, and 300a is replaced with the optical path length in the air, and the focal initial position of each of the objective lenses 21, 22, and 23 is offset beforehand. The focal initial position mentioned here means the stroke central position of the lens holder 26 by the actuator 8. The present embodiment has features wherein with the objective lenses 21, 22, and 23 for BD, DVD, and CD, all of the differences of these stroke central positions can be set to zero.

Here, we can take the above Expressions (1), (2), and (3) as representing the differences of the stroke central positions of an optical pickup employing an existing two-wavelength compatible objective lens. That is to say, (a) In the case of Expression (1), a mode made up of compatible objective lenses for BD and DVD, and an independent objective lens for CD is assumed. In this case, the objective lens for CD is independent from the others, so the stroke center can be set arbitrarily, but the compatible objective lenses for BD and DVD are employed, so consequently, the optical path difference L1 obtained by the thickness difference Δta of the cover layers being converted into the air remains as the difference of the stroke center.

(b) In the case of Expression (2), a mode made up of compatible objective lenses for DVD and CD, and an independent objective lens for BD is assumed. In this case, the objective lens for BD is independent from the others, so the stroke center can be set arbitrarily, but the compatible objective lenses for DVD and CD are employed, so consequently, the optical path difference L2 obtained by the thickness difference Δtb of the cover layers being converted into the air remains as the difference of the stroke center.

(c) In the case of Expression (3), a mode made up of compatible objective lenses for BD and CD, and an independent objective lens for DVD is assumed. In this case, the objective lens for DVD is independent from the others, so the stroke center can be set arbitrarily, but the compatible objective lenses for BD and CD are employed, so consequently, the optical path difference L3 obtained by the thickness difference $\Delta tc$ of the cover layers being converted into the air remains as the difference of the stroke center.

As description will be made below, with the present embodiment, the stroke difference of each of the objective lenses 21, 22, and 23 can be reduced as compared with existing any method such as the above-mentioned (a) through (c). Specifically, the objective lenses 21, 22, and 23 for BD, DVD, and CD are held by the lens holder 26 at the following positions.

The objective lens 21 for BD is held at a predetermined position in the focusing direction by the lens holder 26. A predetermined position may be any position, but this predetermined position becomes a reference position. The objective lens 22 for DVD is held by the lens holder 26 such that the second lens principal point 22a is disposed at a position apart in the focusing direction (focusing direction in the direction apart from the optical disc 1) by the distance equivalent to the difference between the above-mentioned $\Delta fa$ and L1, i.e., by $\Delta fa-L1=0.385-0.31=0.075$ from the first lens principal point 21a serving as the reference position thereof. The reason to consider a focal length is because each of the objective lens 21 for BD, objective lens 22 for DVD, and objective lens 23 for CD is provided individually, and each focal length differs.

Similarly, the objective lens 23 for CD is held by the lens holder 26 such that the third lens principal point 23a is disposed at a position apart in the focusing direction (focusing direction in the direction apart from the optical disc 1) by the distance equivalent to the difference between by $\Delta fc-L3=0.765-0.69=0.075$ from the first lens principal point 21a serving as the reference position.

Thus, the maximum value ($\Delta ST$) of the differences of the stroke central positions of the respective objective lenses 21, 22, and 23 can be set to zero by the lens holder, whereby reduction in thickness of the movable range of the objective lens device 20 can be realized. As a result thereof, reduction in size can be realized regarding the optical pickup device 6 and the optical-disc driving device 50.

The above-mentioned "maximum value" means the greatest value of the three differences of the difference of the stroke central positions of the objective lens 21 for BD and the objective lens 22 for DVD, the difference of the stroke central positions of the objective lens 22 for DVD and the objective lens 23 for CD, and the difference of the stroke central positions of the objective lens 23 for CD and the objective lens 21 for BD.

Also, in the case of this example, the effective diameters of the objective lenses 21, 22, and 23 are almost the same. The relation between effective diameter $\phi$, NA, and focal length f is $$\phi = 2 \times NA \times f$$

Accordingly, as with Japanese Unexamined Patent Application Publication No. 2005-302163 (paragraphs [0060] and [0061], and FIG. 7), and Japanese Unexamined Patent Application Publication No. 2005-293770 (paragraph [0038]), in the event of employing a compatible objective lens, f is fixed, so that the effective diameter becomes large with the ratio of NA. However, like the present embodiment, in the event of employing no compatible objective lens, a case can be prevented wherein the effective diameters of BD and DVD each of which the NA is large become unnecessarily large, which is disadvantageous for reduction in the size, and reduction in the thickness of an optical pickup. This advantage is caused by an arrangement wherein with the present embodiment, the three objective lenses 21, 22, and 23 are independent, and a focal length can be selected individually.

Also, with the present embodiment, reduction in the thickness of the optical pickup device 5 can be realized even without employing a special raising prism (31) such as shown in FIG. 2 in Japanese Unexamined Patent Application Publication No. 2005-100513.

With the present embodiment, the three objective lenses 21, 22, and 23 are independently provided, whereby the objective lens device 20 does not become heavy in particular. Each of the three objective lenses 21, 22, and 23 can be reduced in size, so the mass in total is not changed much as compared with a case wherein a large lens such as a three-wavelength compatible objective lens is employed.

Also, with an existing compatible objective lens, the difference of the stroke central position has been large, so it has been necessary to apply a DC current at the time of displacement from the reference central position to another central position, and accordingly, there has been the need to design taking into consideration sensitivity change and skew change at each stroke position. However, with the present embodiment, there is no difference or sufficiently small difference of the stroke central position, there is no need to apply a great DC current, and also there is no need to take sensitivity change and skew change into consideration for design. As a result thereof, an optical pickup device with high performance and high reliability can be designed.

As described above, it is the most desirable to set the maximum value $\Delta ST$ of the differences of the stroke central positions of the respective objective lenses 21, 22, and 23 to zero, but it is not indispensable to set the maximum value $\Delta ST$ to zero. With the present embodiment, if we say that the difference between the stroke central positions of the objective lens 21 for BD and the objective lens 22 for DVD is taken as $\Delta ST1$, the objective lens 21 for BD and the objective lens 22 for DVD are preferably held by the lens holder 26 so as to satisfy $$\Delta ST1 < L1 \qquad (7)$$

Alternatively, similarly, if we say that the difference between the stroke central positions of the objective lens 22 for DVD and the objective lens 23 for CD is taken as $\Delta ST2$, the objective lens 22 for DVD and the objective lens 23 for CD are preferably held by the lens holder 26 so as to satisfy $$\Delta ST2 < L2 \qquad (8)$$

Alternatively, similarly, if we say that the difference between the stroke central positions of the objective lens 23 for CD and the objective lens 21 for BD is taken as $\Delta ST3$, the objective lens 23 for CD and the objective lens 21 for BD are preferably held by the lens holder 26 so as to satisfy $$\Delta ST3 < L3 \qquad (9)$$

When applying Expressions (7), (8), and (9) to the examples shown in FIG. 6 and FIG. 7, the value of L1 approximately equal to 0.31 shown in Expression (4) is the smallest value. Accordingly, it is the most desirable to satisfy Expression (7).

Even in the event that the stroke central positions of the objective lens 21 for BD, and the objective lens 22 for DVD are deviated, for example, by 0.1 mm or so as to the stroke central position of the objective lens 23 for CD, the advantages relating to the performance of the actuator 8 and reduction in thickness are generally the same as those in the case of $\Delta ST=0$. That is to say, with BD and DVD, there is little specification regarding the curvature of a disc as compared with CD, and the amount of face blurring is small. The specification of face blurring is the maximum ±0.3 mm for BD, and the maximum ±0.4 mm for DVD, and the maximum ±0.5 mm for CD. That is to say, even in the event that the stroke central positions of the objective lens 21 for BD and the objective lens 22 for DVD are deviated by 0.1 mm as to the stroke central position of the objective lens 21 for CD, this deviation is included in the stroke range of CD of which the face blurring is the greatest.

Figure 8:
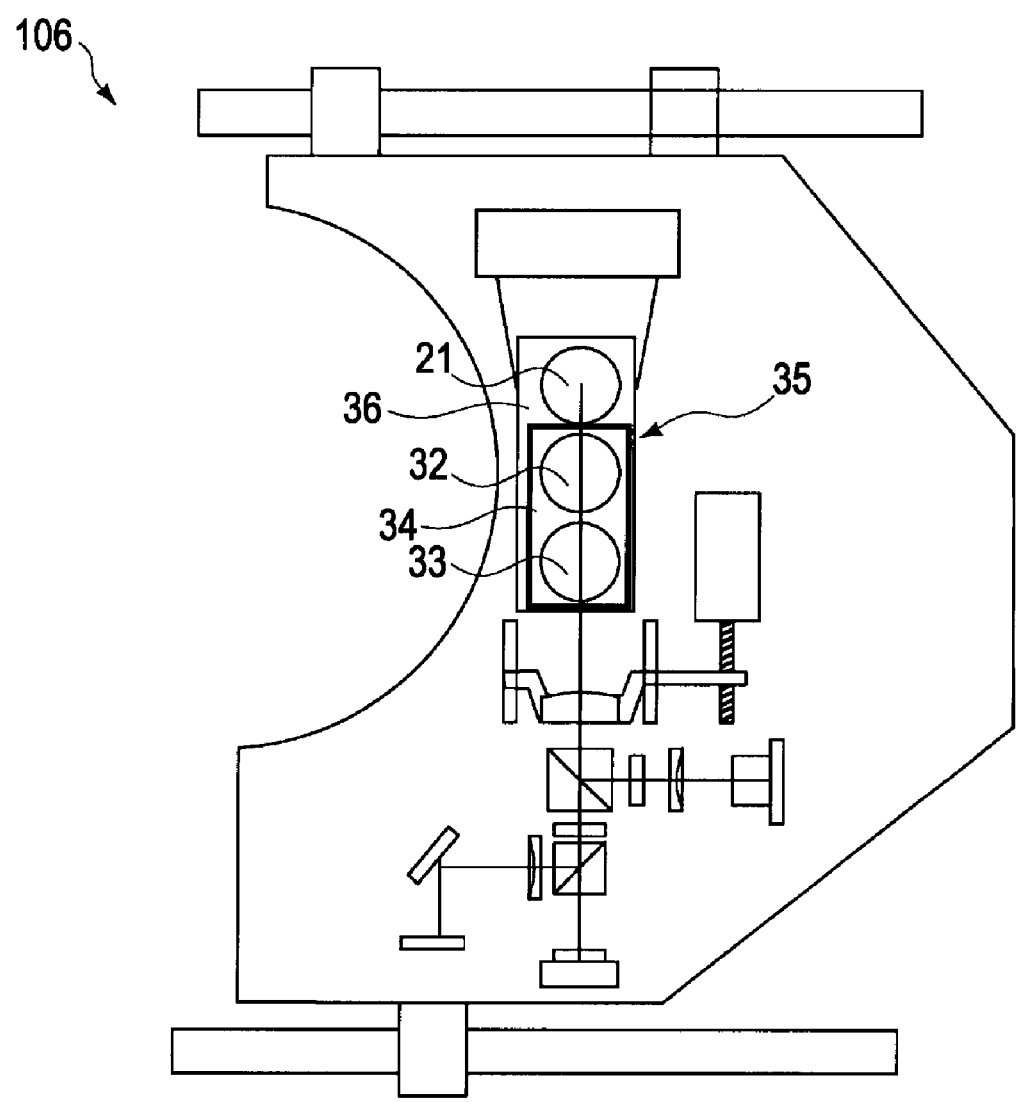
FIG. 8 is a plan view illustrating an optical pickup device according to another embodiment of the present invention.
Figure 9:
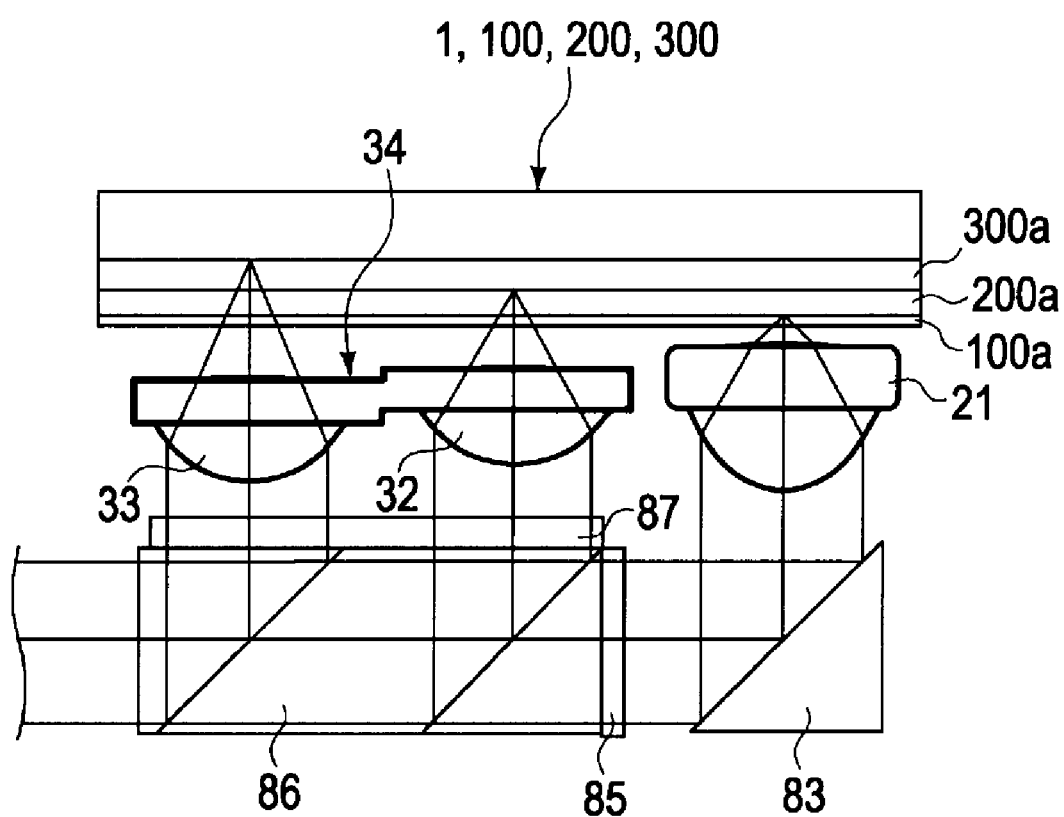
FIG. 9 is a side view of the periphery of the objective lens device of the optical pickup device shown in FIG. 8.

FIG. 8 is a plan view illustrating an optical pickup device according to another embodiment of the present invention. FIG. 9 is a side view of the periphery of the objective lens device of this optical pickup device 106. In the following, description regarding the same members and functions and the like as those of the optical pickup device 6 according to the embodiment shown in FIGS. 2 and 4 and the like will be simplified or omitted, and description will be made primarily regarding the differences.

With the objective lens device 35 of the optical pickup device 106, an objective lens 32 for DVD and an objective lens 33 for CD are integrally molded to make up a DVD/CD objective lens unit 34 (integral-type objective lens). In this case, the objective lenses 32 and 33 for DVD and CD may be made up of a resin, or glass. The DVD/CD objective lens unit 34 and the objective lens 21 for BD are separate members, and these objective lenses are integrally held by a lens holder 36. According to such a configuration, the interval between the two objective lenses 32 and 33 can be reduced, and accordingly, the objective lens device 35 and the optical pickup device 106 can be reduced in size. Also, according to integral molding, the attachment position accuracy and tilt accuracy of the two objective lenses 32 and 33 can be improved at the time of manufacturing the objective lens device 35.

Figure 26A:
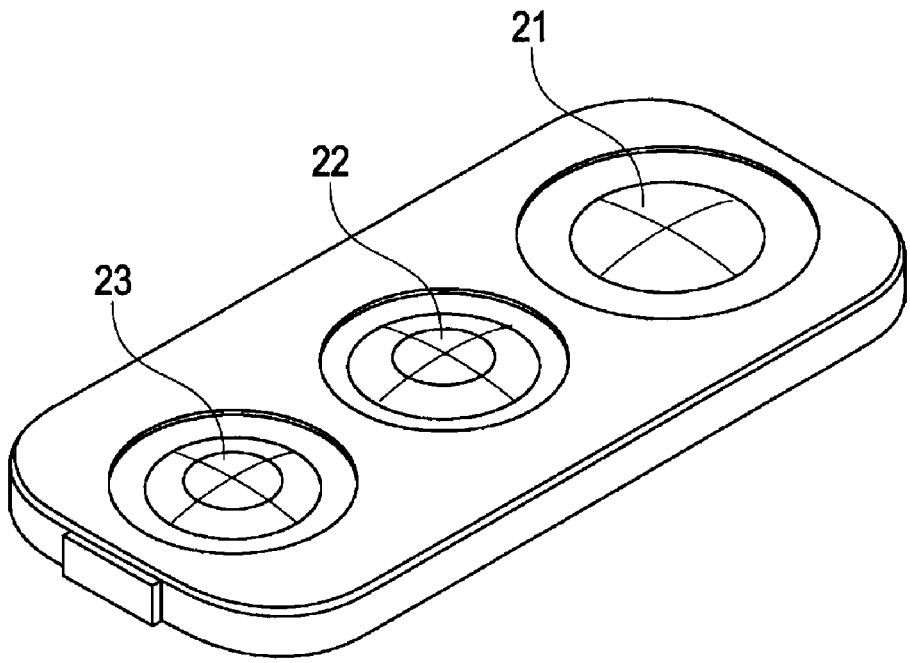
FIG. 26A is a perspective view illustrating an objective lens wherein three objective lenses are integrally molded.
Figure 26B:
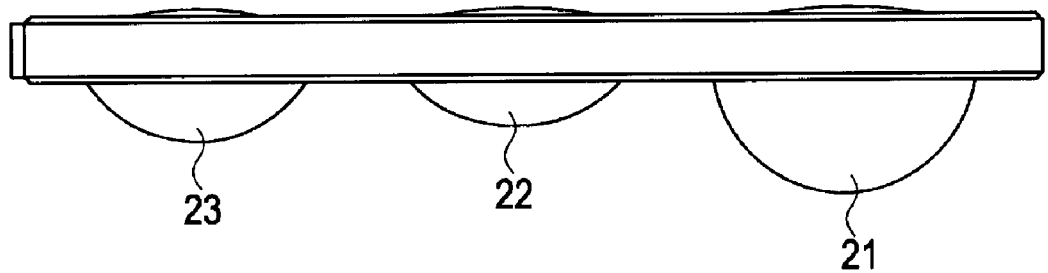
FIG. 26B is the side view thereof.

Thus, the arrangement according to the present embodiment is not restricted to the arrangement wherein the objective lenses 32 and 33 for DVD and CD are integrally molded, so an arrangement may be made wherein objective lenses for BD and CD are integrally molded, and also an objective lens for DVD is independently provided. Further, as shown in FIGS. 26A and 26B, objective lenses for BD, DVD, and CD may be all integrally molded. According to such an arrangement, the intervals between the three objective lenses can be reduced, and thus, the objective lens device 35 and the optical pickup device 106 can be reduced in size. Also, according to integral molding, the attachment position accuracy and tilt accuracy of the three objective lenses can be improved at the time of manufacturing the objective lens device 35.

Figure 10:
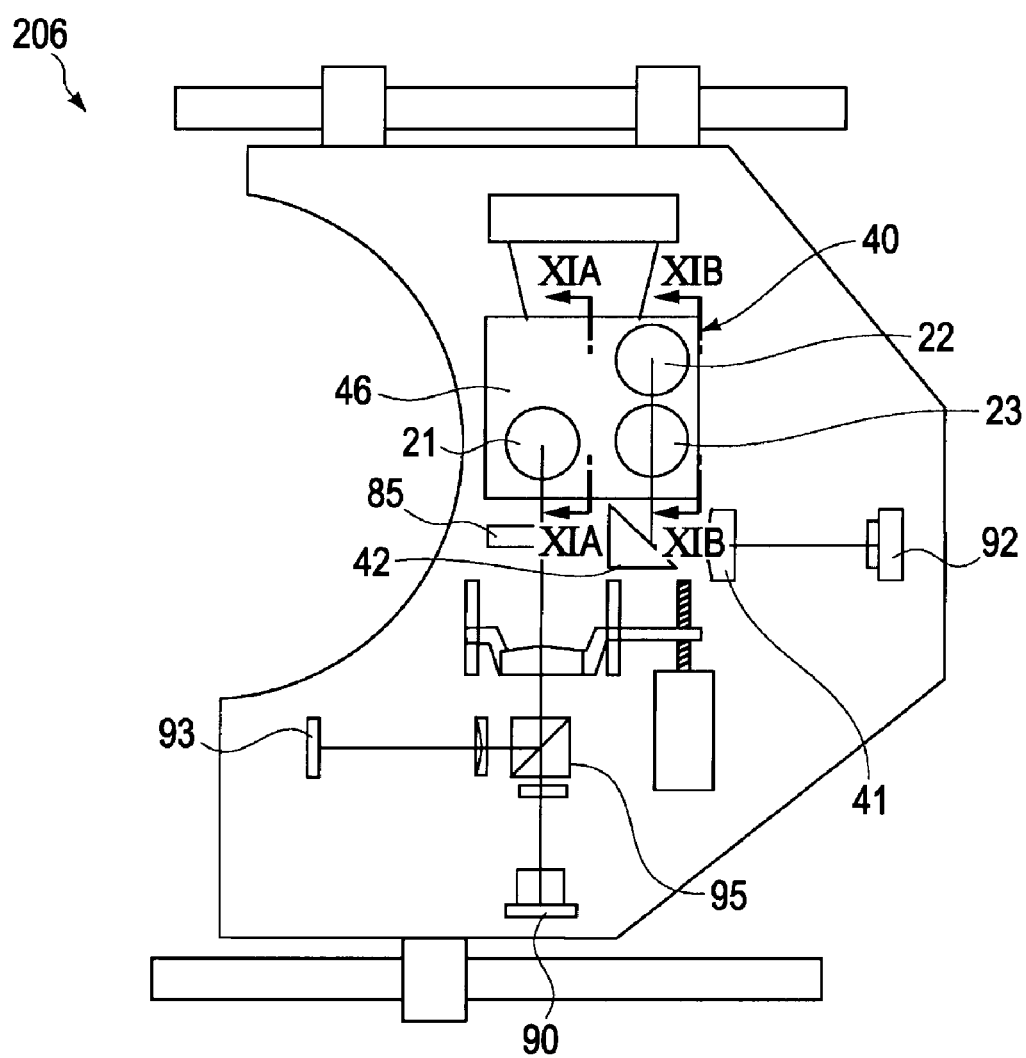
FIG. 10 is a plan view illustrating an optical pickup device according to yet another embodiment of the present invention.
Figure 11A:
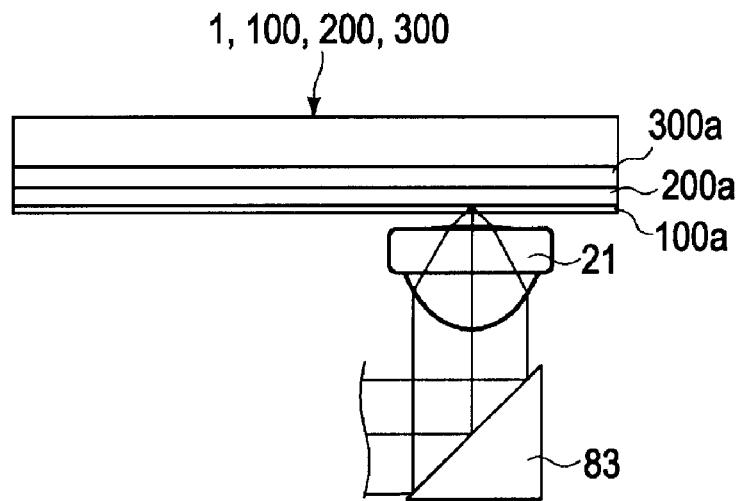
FIG. 11A is a cross-sectional view taken along line XIA-XIA in FIG. 10.
Figure 11B:
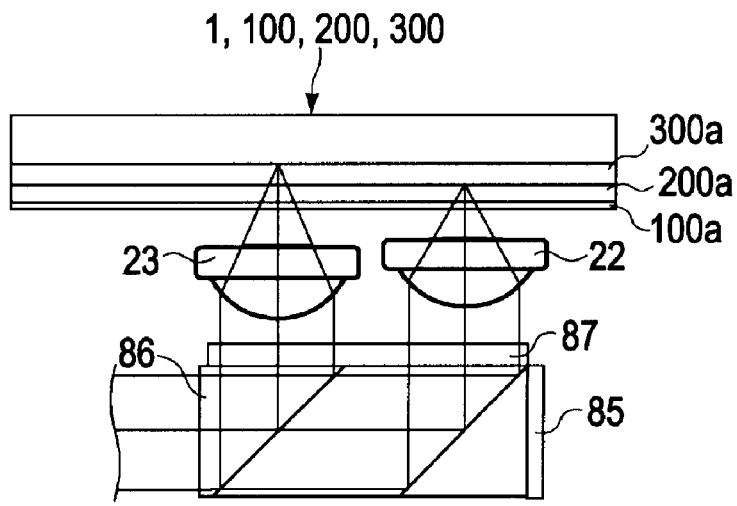
FIG. 11B is a cross-sectional view taken along line XIB-XIB.

FIG. 10 is a plan view illustrating an optical pickup device according to yet another embodiment of the present invention. FIG. 11A is a cross-sectional view taken along line XIA-XIA in FIG. 10, and FIG. 11B is a cross-sectional view taken along line XIB-XIB. With the objective lens device 40 of this optical pickup device 206, the objective lens 21 for BD and the objective lens 23 for CD are disposed so as to be arrayed in the radial direction of the optical disc 1. Also, the objective lens 23 for CD and the objective lens 22 for DVD are disposed so as to be arrayed in the tangential direction of the optical disc 1, and the objective lenses 21, 22, and 23 for BD, DVD, and CD are integrally held by a lens holder 46.

With the optical pickup device 206, as compared with the arrangement shown in FIG. 2, according to the placement of the objective lenses 21, 22, and 23, for example, the placement of one-wavelength laser diode 90 and the placement of laser coupler 92 are reverse. Also, a necessary condenser lens 41, mirror 42, and so forth are provided.

With the present embodiment, according to the design matters such as the configuration and placement and so forth of each component making up the objective lens device 40, or according to the various design matters of the optical-disc driving device in which the optical pickup device 206 is implemented, like the objective lens device 40, the placement of each of the objective lenses 21, 22, and 23 can be designed. For example, in FIG. 10, the placement of the objective lens 21 for BD and the placement of the objective lens 23 for CD may be reverse mutually, or the placement of the objective lens 23 for CD and the placement of the objective lens 22 for DVD may be reverse mutually. Alternatively, the placement of the objective lens 21 for BD and the placement of the objective lens 22 for DVD may be reverse mutually. Also, each of the objective lenses 21, 22, and 23 may be disposed so as to be obliquely arrayed in one row.

Figure 12:
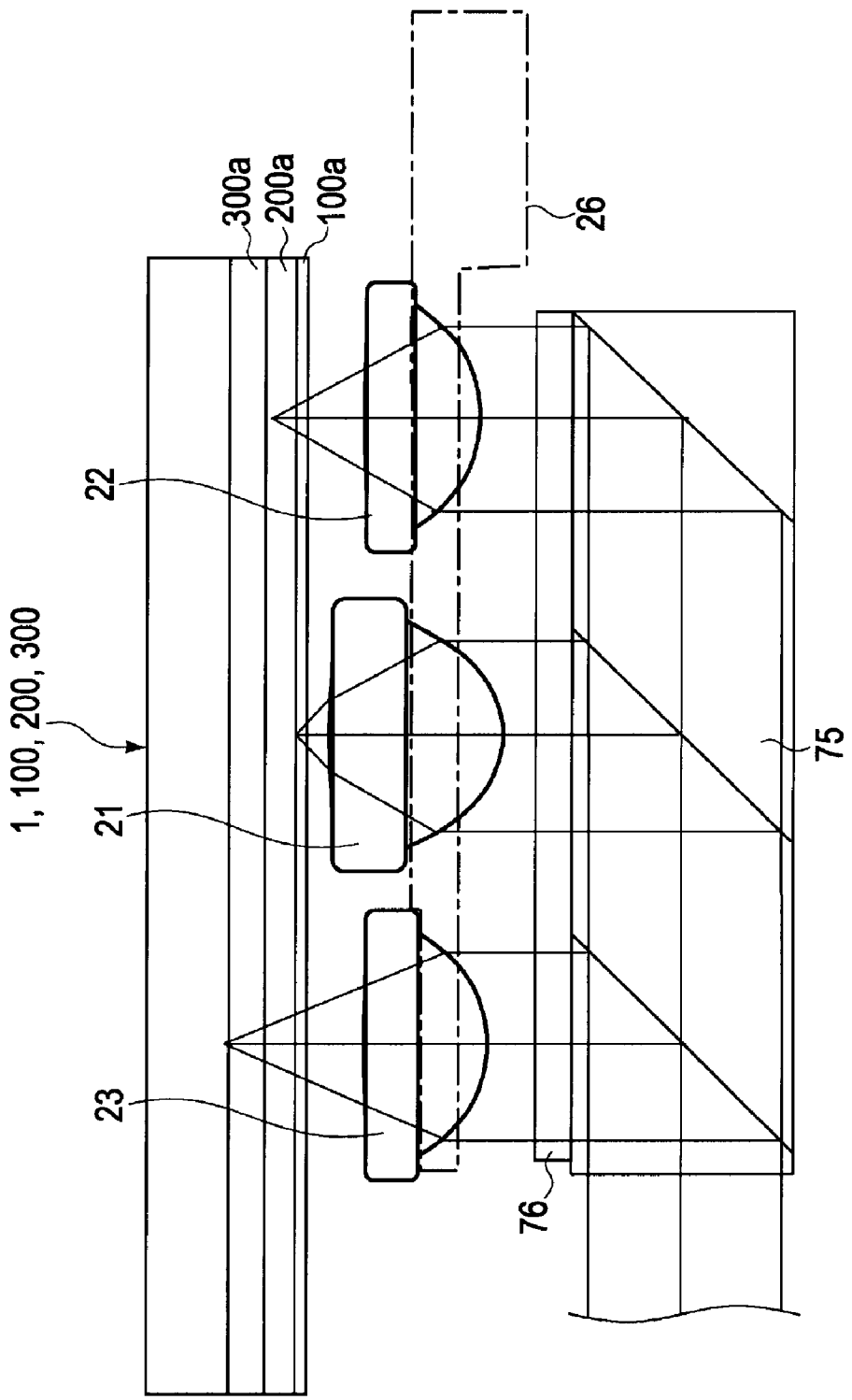
FIG. 12 is a side view illustrating an objective lens device according to yet another embodiment of the present invention, which is a diagram illustrating the objective lens device where an objective lens for BD is disposed in the center.

FIG. 12 is a side view illustrating an objective lens device according to yet another embodiment of the present invention, which is a diagram illustrating the objective lens device where an objective lens for BD is disposed in the center. With this example, from the side near an unshown light source, the objective lens 23 for CD, objective lens 21 for BD, and objective lens 22 for DVD are held by the holder 26 so as to be arrayed in one row. Note that in this case, as shown in FIG. 4, the raising prism 86 and the raising mirror 83 may be disposed, but in FIG. 12, a single raising prism 75 is disposed. A λ/4 plate 76 is disposed between the raising prism 75 and each of the objective lenses 21, 22, and 23.

The present invention is not restricted to the above-mentioned embodiments, and various modifications may be applied thereto.

With the optical paths of the optical system 30 shown in FIGS. 2 and 4, a part of the optical paths of the first, second, and third laser beams are common, which is cited as an example. However, the optical system 30 may be configured such that the optical paths of the first, second, and third laser beams are each independent.

The objective lens 22 for DVD of the objective lens device 20 shown in FIG. 4 can be employed as an objective lens for HD DVD. That is to say, with the optical pickup device 6, four formats of optical disc can be handled with the three objective lenses 21, 22, and 23. DVD and HD DVD are generally the same regarding NA and the thickness of a cover layer which are important for design. Accordingly, for example, a hologram of wavelength selectivity is employed, whereby the objective lens 22 for DVD can serve as an objective lens for HD DVD.

Figure 13:
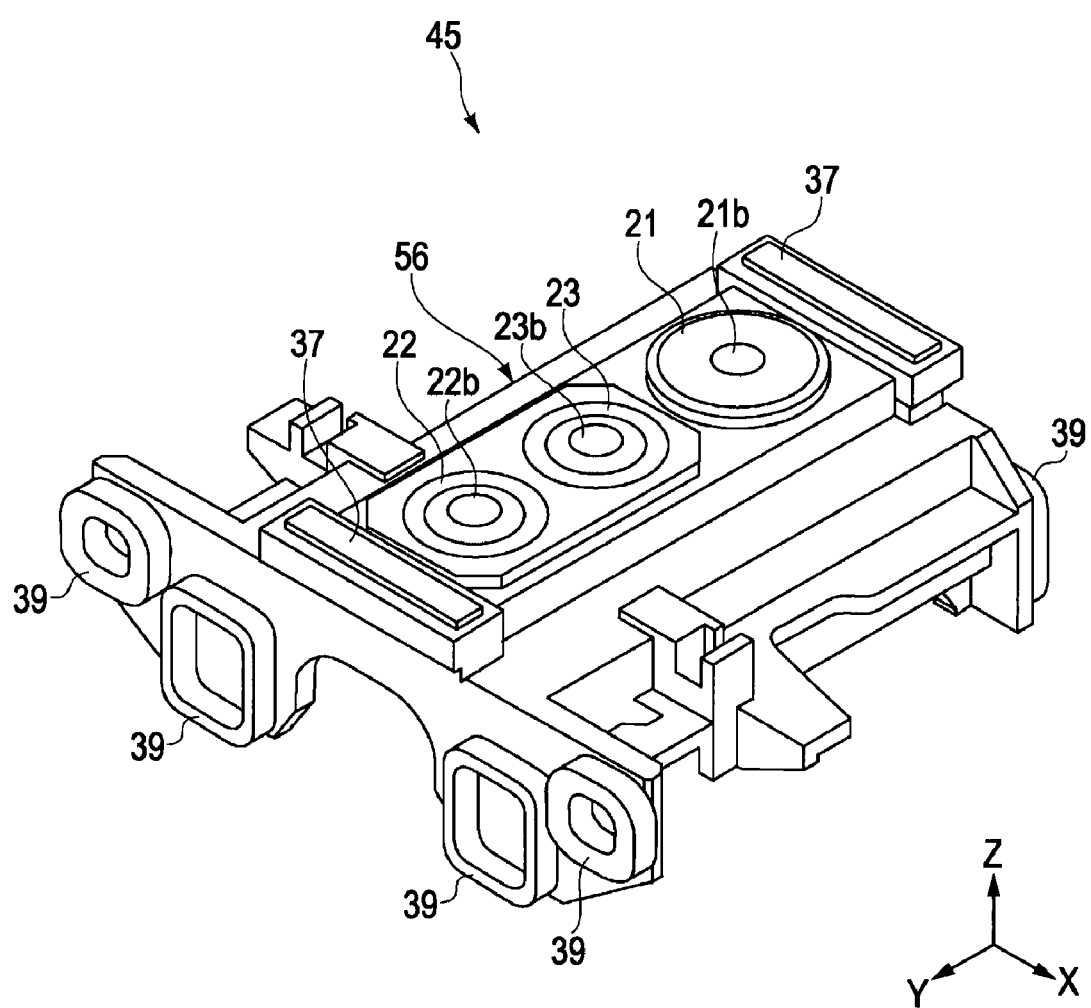
FIG. 13 is a perspective view illustrating an objective lens device according to yet another embodiment of the present invention.

FIG. 13 is a perspective view illustrating an objective lens device according to yet another embodiment of the present invention. With the objective lens device 45 according to the present embodiment, such that the objective lens 22 for DVD, objective lens 23 for CD, and objective lens 21 for BD are disposed in order from the side near a light source such as the laser coupler 92, these objective lenses 21, 22, and 23 are held by a lens holder 56. A coil 39 configured to subject the lens holder 56 to biaxial or triaxial drive is mounted on the end portion of the lens holder 56. Hereafter, the objective lens 21 for BD, objective lens 22 for DVD, and objective lens 23 for CD will be referred to as objective lenses 21 through 23 in some cases.

Now, let us consider a mechanical vibration system including the objective lens 21 for BD, objective lens 22 for DVD, and objective lens 23 for CD, and lens holder 56. The objective lens 23 for CD is disposed at a position near the anti-node of vibration of the vibration system when the vibration system resonates as compared with the other two objective lenses. With the example shown in FIG. 13, the objective lens 23 for CD is disposed near the center of the lens holder 56. With the present embodiment, an example is shown wherein the objective lens 23 for CD and the objective lens 22 for DVD are integrally molded such as shown in FIG. 8. However, the objective lenses 21 through 23 may be separate members, or may be a lens unit wherein all of the objective lenses 21 through 23 such as shown in FIGS. 26A and 26B are integrally molded.

Figure 14A:
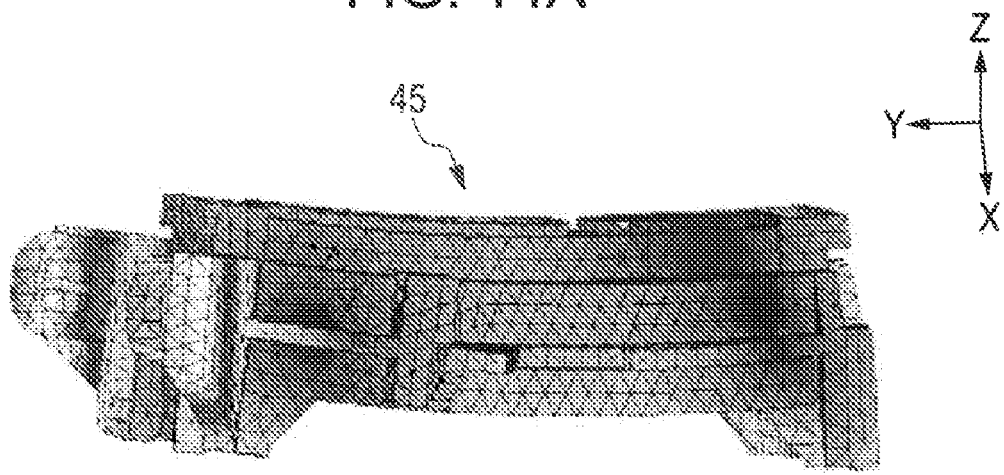
FIG. 14A is a diagram wherein the resonance in the focusing direction of a vibration system is simulated.
Figure 14B:
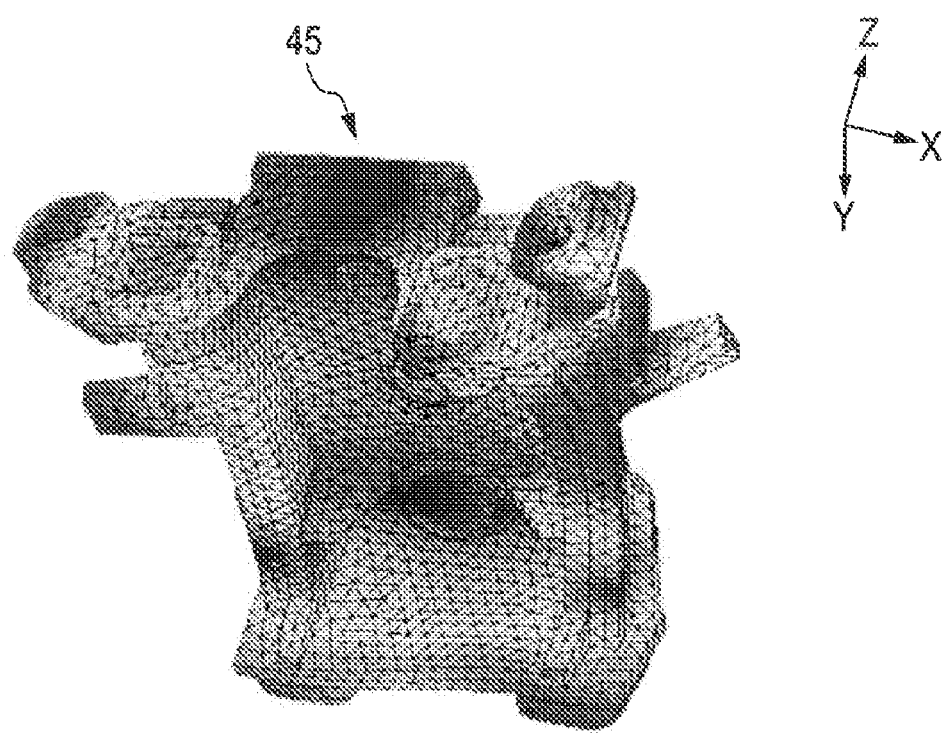
FIG. 14B is a diagram wherein the resonance in the tracking direction of the vibration system is simulated.
Figure 15A:
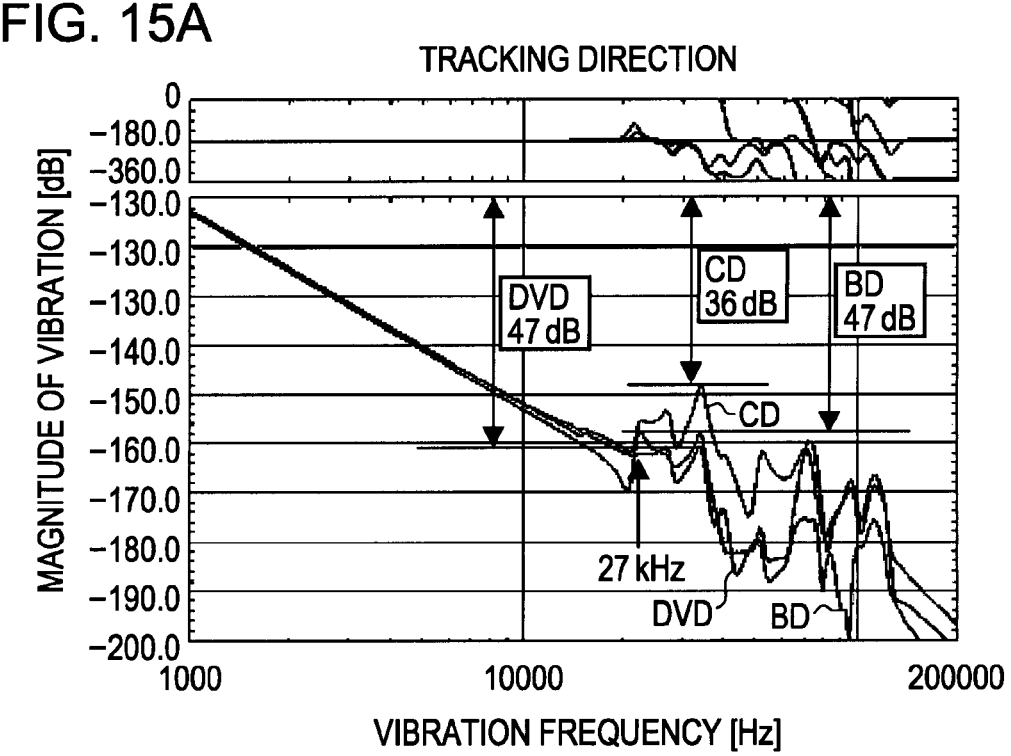
FIG. 15A is a graph illustrating the resonant peak in FIG. 14A for each objective lens.
Figure 15B:
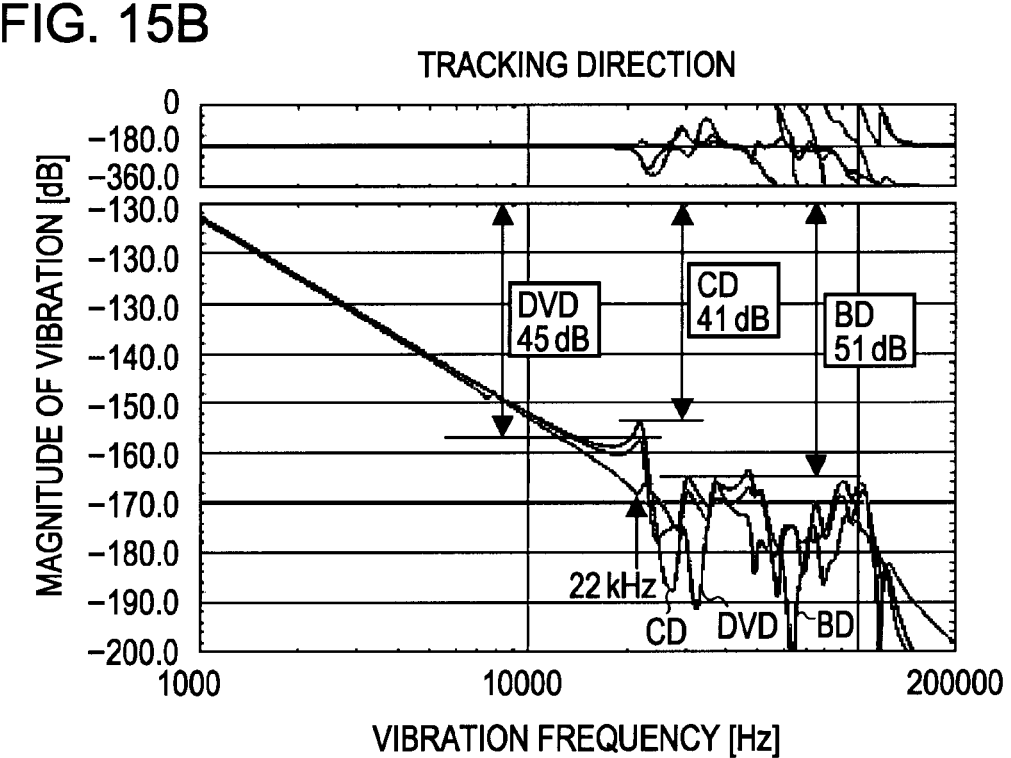
FIG. 15B is a graph illustrating the resonant peak in FIG. 14B for each objective lens.

FIG. 14A is a diagram wherein the resonance in the focusing direction (Z-axis direction) of the vibration system is simulated. FIG. 15A is a graph illustrating the resonant peak in FIG. 14A for each of the objective lenses 21 through 23. In this case, the resonance frequency (secondary) was 27 kHz. FIG. 14B is a diagram wherein the resonance in the tracking direction (X-axis direction) of the vibration system is simulated. FIG. 15B is a graph illustrating the resonant peak in FIG. 14B for each of the objective lenses 21 through 23. In this case, the resonance frequency (secondary) was 22 kHz. It can be understood from FIGS. 14A and 14B that around the center of the lens holder is the anti-node of the resonance in the focusing direction and in the tracking direction.

The greater the NA of an objective lens is, the smaller the condensing spot can be narrowed down, and while the recording density of the optical disc 1 becomes high, the depth of focus will become small. As a result thereof, the higher the recording density of the optical disc 1 is, the higher accuracy is demanded regarding focusing servo and tracking servo. Accordingly, the objective lens 21 for BD and the objective lens 22 for DVD, which have a large NA, are disposed at a position far away from the anti-node of resonance so as to not be affected by the vibration system as much as possible, and the objective lens 23 for CD of which the NA is the minimum is disposed at a position near the anti-node of resonance. Thus, a recording or playback error regarding a signal caused by the objective lenses 21 through 23 can be prevented. A thin optical disc drive is frequently employed with the maximum 5000 through 6000 rpm or so as the number of revolutions of the spindle motor 9 (around 24× for CD, around 8× for DVD, and around 5× for BD), and particularly in the event of recording or playback at such a high speed, a highly precise servo is demanded, and accordingly, the present embodiment is effective.

Figure 16:
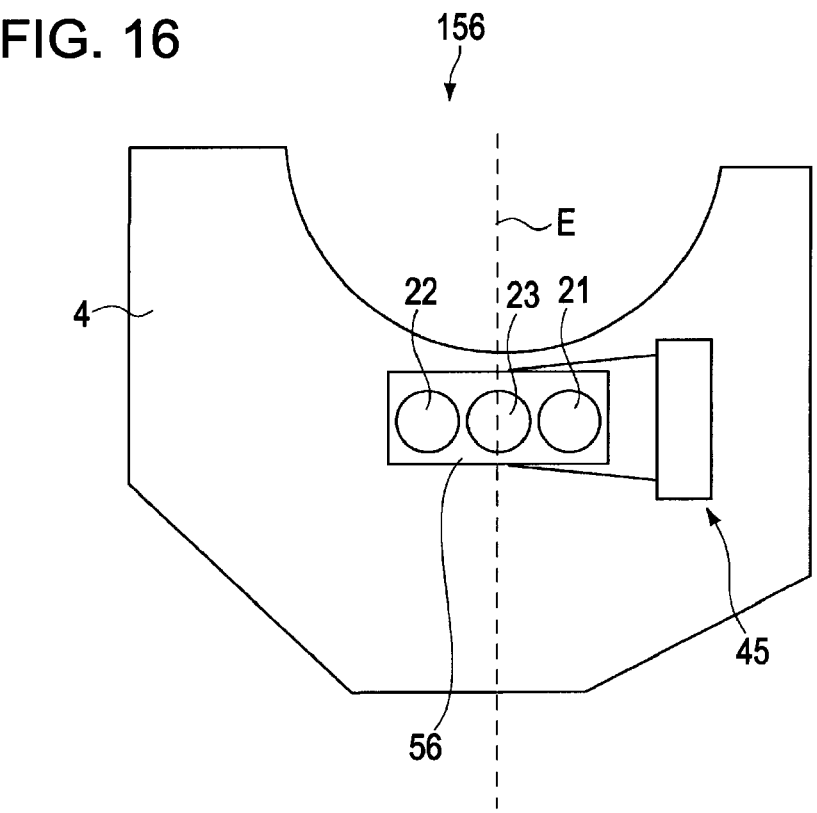
FIG. 16 is a schematic view illustrating an example of the initial position of the objective lens device shown in FIG. 13.
Figure 17:
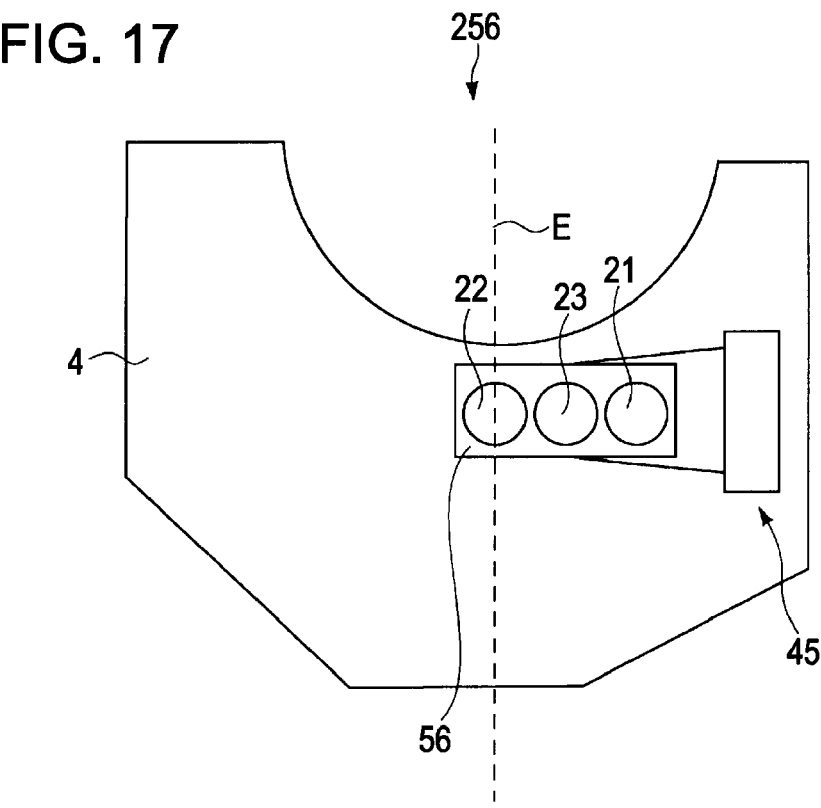
FIG. 17 is a schematic view illustrating another example of the initial position of the objective lens device shown in FIG. 13.

In the event of the present embodiment, as shown in FIG. 16, the objective lens device 45 is disposed on the moving base 4 as follows. At the time of non-operation of an optical pickup device 156, the objective lens device 45 is disposed such that the objective lens 23 for CD is disposed at a position where the center line E passes through, which passes trough the center of the optical disc 1 when the optical disc 1 is held by the disc damper 3 (see FIG. 1). Alternatively, as shown in FIG. 17, the objective lens device 45 may be disposed such that the objective lens 23 for CD is positioned at a position shifted from the center line E thereof at the time of non-operation of an optical pickup device 256.

The position of the anti-node of resonance is not always around the center of the lens holder 56 depending on the shape of the lens holder 56 or the position of the coil 39 or the like. For example, in the event that the respective objective lenses 21 through 23 are disposed in the order shown in FIG. 4 or FIG. 12, the objective lens 23 for CD may be disposed in the nearest position of the anti-node of resonance of the vibration system thereof in some cases. The concept of the present embodiment is that the objective lens 23 for CD is disposed at the portion of the anti-node of resonance of the vibration system. The position of the anti-node of resonance of the vibration system may be intentionally set at the time of manufacturing an objective lens device.

Also, with the objective lens device 45 shown in FIG. 13, a protector 37 is provided on the top face of the lens holder 56.

The protector 37 has a function of preventing the optical disc 1 from coming into contact with at least one of the three objective lenses 21 through 23 (particularly, the upper end faces of the objective lenses 21 through 23). That is to say, the height of the upper end face of the protector is set so as to be higher than the height of the upper end faces 21b, 22b, and 23b of the objective lenses 21 through 23.

As for the protector 37, for example, two protectors are provided in the tangential direction (Y-axis direction), but a single protector may be provided, and also may be disposed in any position. The material of the protector 37 is a resin, rubber, metal, or the like, but may be another material.

Figure 18:
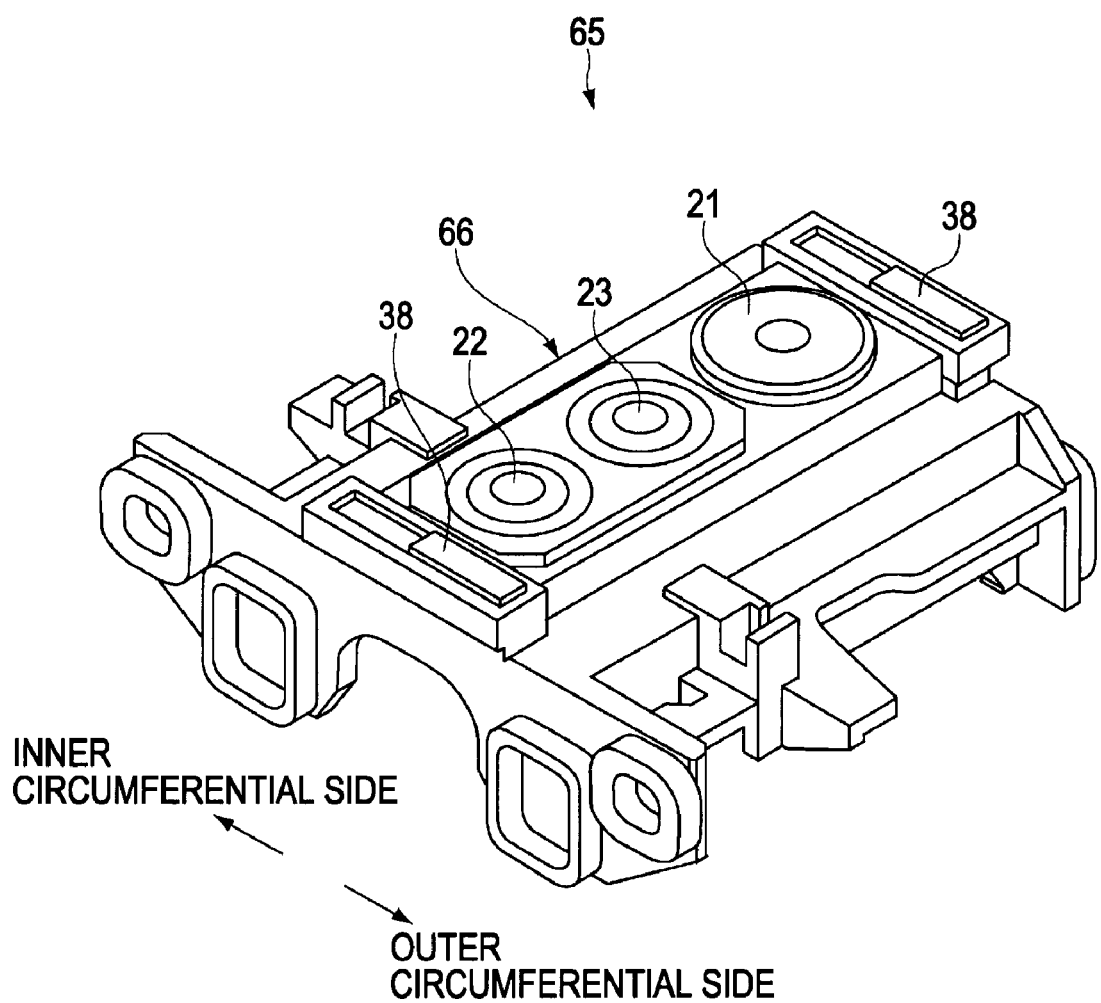
FIG. 18 is a perspective view illustrating an objective lens device including a protector according to another embodiment.

FIG. 18 is a perspective view illustrating an objective lens device including a protector according to another embodiment. The protector 38 according to the present embodiment is provided at the outer circumferential side in the radial direction of the optical disc 1, and is not provided at the inner circumferential side. That is to say, the protector 38 is provided from almost the central position of the top face of a lens holder 66 toward the outer circumferential side in the radial direction thereof. Thus, the protector 38 can be prevented from coming into contact with an annular rib (not shown) formed on the inner circumferential portion of a CD. Note that the maximum height of the rib is specified to be 0.4 mm.

In FIG. 18, the protector 38 is provided from almost the central position of the top face of the lens holder 66 toward the outer circumferential side in the radial direction thereof, but may be provided at any position of the lens holder 66 as long as the protector 38 is prevented from coming into contact with the rib of the inner circumferential portion of a CD.

Note that the concept of the objective lens device 45 shown in FIG. 13 may be applied to the objective lens devices 35 and 40 shown in FIG. 8 or FIG. 10, or may be applied to an objective lens device according to another embodiment which will be described below.

Figure 19:
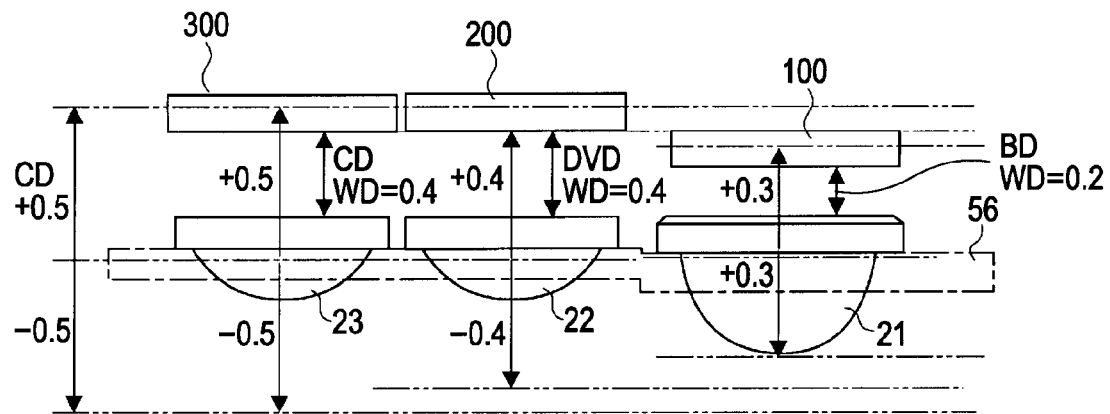
FIG. 19 is a diagram illustrating the necessary minimum stroke and WD of each objective lens.

Next, description will be made regarding another embodiment of the relative height placement of the objective lens 21 for BD, objective lens 22 for DVD, and objective lens 23 for CD. FIG. 19 is a diagram illustrating the necessary minimum stroke (necessary minimum focal stroke) and WD of each of the objective lenses 21 through 23. Note that in FIG. 19, the sizes of the objective lenses 21 through 23 are represented as being small as to each dimension value (in units of mm).

With the present embodiment, the necessary minimum stroke range of each of the objective lens 21 for BD and objective lens 22 for DVD is included in the necessary minimum stroke range of the objective lens 23 for CD. The WD of each of the objective lenses 21 through 23 is set. The necessary minimum stroke mentioned here means a distance equivalent to the amount of permissible face blurring (standard value) of the optical disc 1. For example, the necessary minimum stroke of the objective lens 23 for CD is the amount of permissible face blurring of CD ±0.5 mm (maximum 1.0 mm). The necessary minimum stroke of the objective lens 22 for DVD is the amount of permissible face blurring of DVD ±0.4 mm (maximum 0.8 mm). The necessary minimum stroke of the objective lens 21 for BD is the amount of permissible face blurring of BD ±0.3 mm (maximum 0.6 mm). That is to say, the concept of the present embodiment is that the lens holder 56 holds each of the objective lenses 21 through 23 such that the necessary minimum stroke range of each of the objective lenses 22 and 21 for DVD and BD is included in the range of the amount of permissible face blurring of CD ±0.5 mm which is the necessary minimum stroke. According to such an arrangement, the height placement of each of the objective lenses 22 and 21 for DVD and BD can be set arbitrarily within the range of ±0.5 mm even while realizing reduction in thickness at the time of manufacturing an objective lens device.

With the present embodiment, the WD of each of the objective lenses 21 through 23 is set to 0.2 mm, 0.4 mm, and 0.4 mm.

Figure 20:
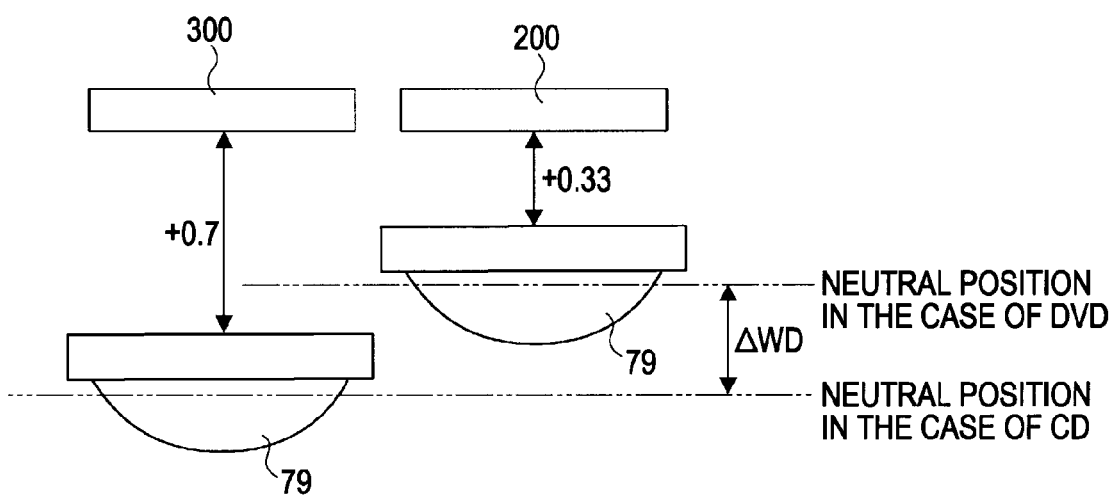
FIG. 20 is a diagram illustrating the WD of an existing compatible objective lens for CD and DVD.

FIG. 20 is a diagram illustrating the WD of an existing compatible objective lens for CD and DVD. As can be understood from this drawing, it is unavoidable to increase the necessary minimum stroke of the objective lens by employing a compatible objective lens 79, and also the WD increases by just that much. In the case of CD, the WD is 0.7 mm, and in the case of DVD, the WD is 0.33 mm. As described regarding Japanese Unexamined Patent Application Publication No. 2005-302163 (paragraphs [0060] and [0061], and FIG. 7), there is the difference (ΔWD) between the two WD, so in the case of both the discs 200 and 300, the neutral position of the compatible objective lens 79 differs. Accordingly, the space equivalent to the difference needs to be secured, and consequently, the movable range of the objective lens device to be secured increases.

FIG. 21 is a diagram illustrating another embodiment of an objective lens device wherein an objective lens for CD and an objective lens for DVD such as shown in FIGS. 8 and 9 are integrally molded. With a DVD/CD objective lens unit 134 integrally molded, the upper end face 23b of the objective lens 23 for CD and the upper end face 22b of the objective lens 22 for DVD are set to the same height. Also, in the event that the upper end face 21b of the objective lens 21 for BD is also set to the same height as the upper end faces 23b and 22b of the DVD/CD objective lens unit 134, manufacturing is facilitated, and also the above-mentioned protectors 37 and 38 can be readily disposed, and also possibility of a collision over the optical disk of each lens can be suppressed to the minimum.

Also, the WD of the DVD/CD objective lens unit 134 is set within a range of 0.2 through 0.5 mm. With the example shown in FIG. 21, the WD thereof is set to 0.4 mm.

Description will be made regarding the above-mentioned lower limit value of 0.2 mm. In the case of CD, a maximum of 0.1-mm annular rib is provided in the outer circumferential portion of a CD. Also, a cover layer thickness of 1.2±0.1 mm is specified, so a CD having a cover layer thickness of 1.3 mm is assumed to be employed as a CD having the thickest cover layer. Consequently, the objective lens approaches the disc of 1.3 mm by 0.06 (approximately equal to 0.1/1.6) which is the distance equivalent to the air conversion of 0.1 mm which is the difference between 1.2 mm and 1.3 mm. Accordingly, even with only the condition of collision avoidance with the rib of the outer circumferential portion, there is the need to secure a lower limit of 0.16 mm (0.1+0.06) WD. Further, taking into consideration, for example, the tilt of a disc at the time of the CD (or DVD) being subjected to chucking by the chucking mechanism, or the tilt of the DVD/CD objective lens unit 134 held by the lens holder 66, or the like, the WD becomes 0.16 mm+(0.02 through 0.04 mm)=0.2 mm.

Description will be made regarding the above-mentioned upper limit value of 0.5 mm. The difference of each cover layer thickness of CD and DVD is 1.2−0.6=0.6 mm. When converting this into the air, it becomes 0.36 (approximately equal to 0.6/1.6). The above-mentioned lower limit value of 0.2 mm is added to 0.36, and the fraction thereof is rounded off, thereby obtaining 0.5 mm.

In the event that the WD of the DVD/CD objective unit 134 is thus set, with regard to the WD of the objective lens 21 for BD, the difference of 0.2 mm of the necessary minimum stroke (one side) of each of the objective lens 21 for BD and the objective lens 23 for CD is taken into consideration, with the example shown in FIG. 21, while the WD of the DVD/CD objective lens unit 134 is set to 0.4 mm, the WD of the objective lens 21 for BD is set to 0.2 mm.

Figure 22:
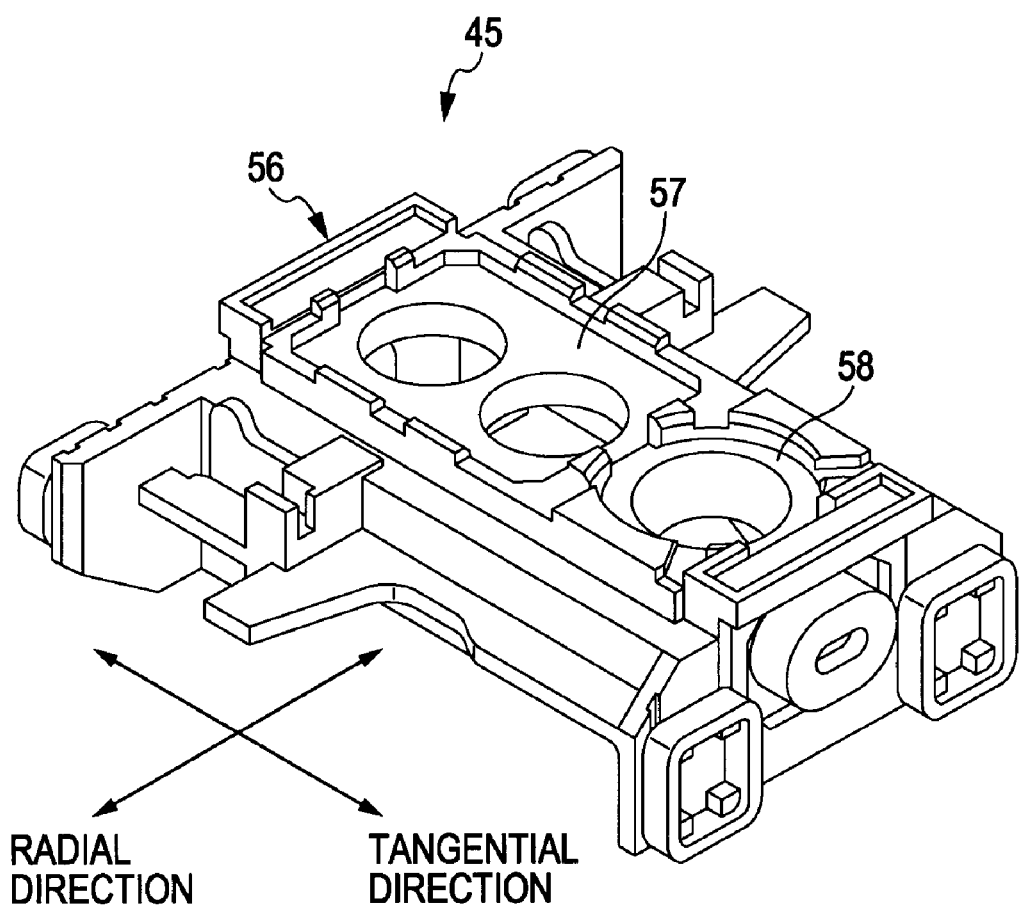
FIG. 22 is a perspective view illustrating a lens holder on which a DVD/CD objective lens unit and an objective lens for BD are mounted.

FIG. 22 is a perspective view illustrating, for example, the lens holder on which the DVD/CD objective lens unit 134 and the objective lens 21 for BD are mounted. The DVD/CD objective lens unit 134 is mounted on a recessed portion 57, and the objective lens 21 is mounted on a recessed portion 58.

For example, when manufacturing the objective lens device 45, first the DVD/CD objective lens unit 134 is fitted in the recessed portion 57. The skew values in the radial and tangential directions of the DVD/CD objective lens unit 134 at this time are taken as references. A worker adjusts the skew in the tangential direction of the objective lens for BD so as to match the skew in the tangential direction of the objective lens 21 for BD with the reference skew value of the DVD/CD objective lens unit 134. The radial direction of the objective lens 21 for BD, even if skew adjustment is not performed, can be adjusted at the time of recording or playback using a biaxial or triaxial actuator.

Figure 23:
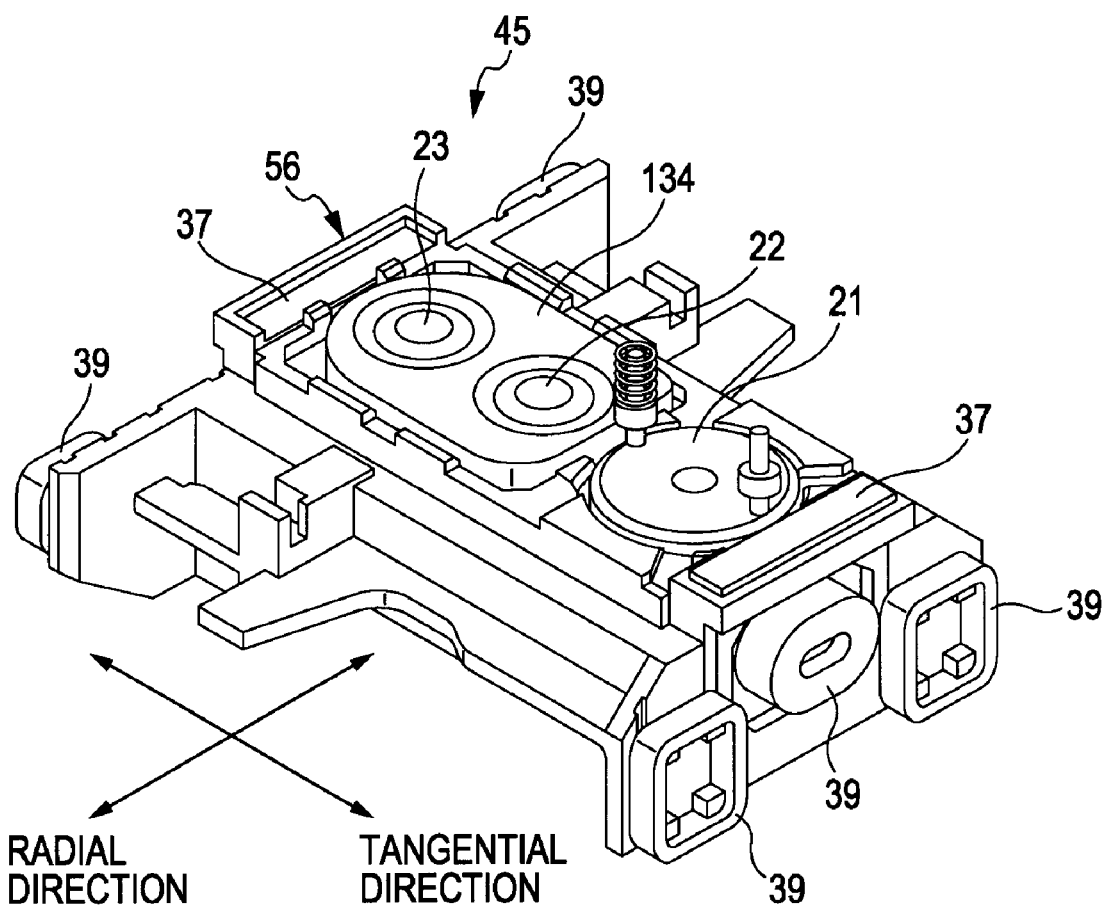
FIG. 23 is a diagram illustrating a skew adjustment situation of the objective lens for BD shown in FIG. 22.
Figure 24:
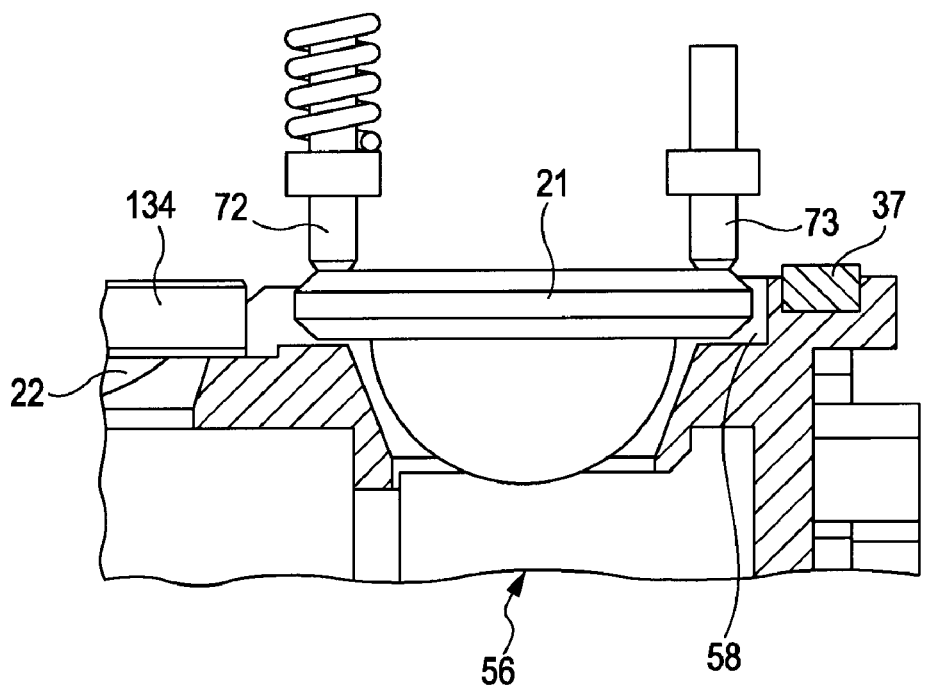
FIG. 24 is a cross-sectional view of the objective lens for BD at the time of the skew adjustment thereof.

FIG. 23 illustrates this skew adjustment situation. FIG. 24 is a cross-sectional view of the objective lens 21 for BD at the time of skew adjustment. For example, of an adjustment tool having two tap pins 72 and 73, the height of the single pin 72 is adjusted, whereby skew adjustment is performed.

Thus, the size of the DVD/CD objective lens unit 134 is large, so skew adjustment can be readily performed by adjusting the skew of the objective lens 21 for BD as compared with adjusting the skew of the DVD/CD objective lens unit 134.

At least one of the objective lenses 21 through 23 according to the above-mentioned respective embodiments may include a self-aperture portion. Thus, there is no need to provide high positioning accuracy as compared with the case of providing an aperture in a lens holder like an existing arrangement.

Figure 25:
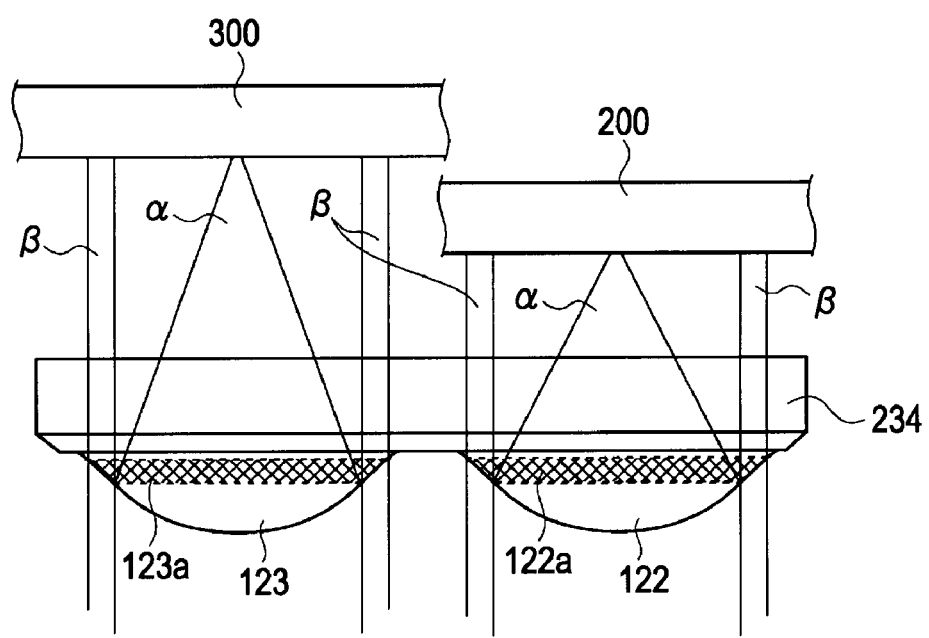
FIG. 25 is a diagram illustrating a DVD/CD objective lens unit including self-aperture portions.

Particularly, the DVD/CD objective lens units 34 and 134 may have a self-aperture portion. FIG. 25 is a diagram illustrating a DVD/CD objective lens unit including self-aperture portions 122a and 123a. With the example in FIG. 25, as described in Japanese Unexamined Patent Application Publication No. 2000-30278, a DVD/CD objective lens unit 234 has a curved surface shown with a predetermined function, thereby forming annular self-aperture portions 122a and 123a.

Typically, a laser beam entering within a predetermined radius from the radial direction (Y-axis direction) of an objective lens 123 for CD (or objective lens 122 for DVD) is converged on the pit of CD300 (or DVD200) (convergence light α). A laser beam entering in the self-aperture portion 123a (or 122a) outside the above-mentioned predetermined radius is emitted as a beam which does not contributes to recording/playback processing even if the beam is a parallel beam β, divergent beam, or convergence beam. That is to say, even if there is no existing arrangement wherein an aperture is separated from an objective lens, the DVD/CD objective lens unit 234 includes an aperture function. Thus, reduction in size and reduction in thickness can be realized regarding an objective lens device.

In the event that an existing aperture, and the apertures for the objective lenses 23 and 22 for CD and DVD are each provided in the lens holder, it is difficult to match the center of each aperture with the center of each of the objective lenses 23 and 22 for CD and DVD (position of optical axis). On the other hand, with the present embodiment, the objective lenses 123 and 122 for CD and DVD of the DVD/CD objective lens unit 234 have the self-aperture portions 123a and 122a respectively, so there is no problem such as described above.

Note that the self-aperture portions 122a and 123a are not restricted to the case of being defined with a function of a curved surface. Any arrangement can be employed as long as a laser beam is emitted as a parallel beam, or diffused by the arrangement.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens device comprising:
    a first objective lens having a first numerical aperture, which can condense light into a disc-shaped first optical recording medium including a first cover layer of first thickness;
    a second objective lens having a second numerical aperture which is smaller than said first numerical aperture, which can condense light into a disc-shaped second optical recording medium including a second cover layer of second thickness which is thicker than said first thickness;
    a third objective lens having a third numerical aperture which is smaller than said second numerical aperture, which can condense light into a disc-shaped third optical recording medium including a third cover layer of third thickness which is thicker than said second thickness; and
    a lens holder configured to integrally hold said first, second, and third objective lenses,
    wherein when a mechanical vibration system including said first objective lens, second objective lens, third objective lens, and said lens holder resonates, said third objective lens is disposed at a position near the anti-node of vibration of the vibration system as compared with said first objective lens and said second objective lens.

2. The objective lens device according to claim 1, wherein said first objective lens includes a first focal length and a first lens principal point;
    and wherein said second objective lens includes a second focal length and a second lens principal point;
    and wherein said third objective lens includes a third focal length and a third lens principal point;
    and wherein said lens holder holds said second objective lens such that said second lens principal point is disposed at a position apart by distance equivalent to the difference (A−D) between a first focal length difference (A) which is the difference between said second focal length and said first focal length, and a first cover thickness difference converted into distance in the air (D) which is an optical path length in the air equivalent to the difference between said second thickness and said first thickness;
    and wherein said lens holder holds said third objective lens such that said third lens principal point is disposed at a position apart by distance equivalent to the difference (C−F) between a second focal length difference (C) which is the difference between said third focal length and said first focal length, and a second cover thickness difference converted into distance in the air (F) which is an optical path length in the air equivalent to the difference between said third thickness and said first thickness.

3. The objective lens device according to claim 1, wherein at least two of said first, second, and third objective lenses are configured by integral molding.

4. The objective lens device according to claim 3, wherein said first, second, and third objective lenses are configured by integral molding.

5. The objective lens device according to claim 1, wherein said first numerical aperture is in an inclusive range of 0.8 through 0.9;
    and wherein said second numerical aperture is in an inclusive range of 0.6 through 0.7;
    and wherein said third numerical aperture is in an inclusive range of 0.45 through 0.55.

6. The objective lens device according to claim 1, wherein said third objective lens is disposed between said first objective lens and said second objective lens.

7. The objective lens device according to claim 1, wherein said lens holder holds said first, second, and third objective lenses such that the necessary minimum stroke range of said second objective lens, and the necessary minimum stroke range of said first objective lens are included in the necessary minimum stroke range of said third objective lens.

8. The objective lens device according to claim 1, wherein the working distance of said second objective lens and said third objective lens is in an inclusive range of 0.2 through 0.5 mm.

9. The objective lens device according to claim 1, further comprising:
    a protector, which is provided in said lens holder, configured to prevent said first, second, or third optical recording medium from coming into contact with at least one of said first, second, and third objective lenses.

10. The objective lens device according to claim 9, wherein said protector is provided at the outer circumferential side in the radial direction of said first, second, or third optical recording medium in said lens holder.

11. The objective lens device according to claim 1, wherein at least one of said first, second, and third objective lenses includes a self-aperture portion.

12. The objective lens device according to claim 1, wherein at least two of said first, second, and third objective lenses are integral-type objective lenses which are integrally molded;
    and wherein said integral-type objective lenses include a self-aperture portion.

13. An optical pickup device comprising:
    a light source configured to emit a first laser beam including a first wavelength, a second laser beam including a second wavelength which is longer than said first wavelength, and a third laser beam including a third wavelength which is longer than said second wavelength;
    a first objective lens having a first numerical aperture, which can condense said first laser beam into a disc-shaped first optical recording medium including a first cover layer of first thickness;
    a second objective lens having a second numerical aperture which is smaller than said first numerical aperture, which can condense said second laser beam into a disc-shaped second optical recording medium including a second cover layer of second thickness which is thicker than said first thickness;
    a third objective lens having a third numerical aperture which is smaller than said second numerical aperture, which can condense said third laser beam into a disc-shaped third optical recording medium including a third cover layer of third thickness which is thicker than said second thickness;
    a lens holder configured to integrally hold said first, second, and third objective lenses; and
    an actuator configured to drive said lens holder, wherein when a mechanical vibration system including said first objective lens, second objective lens, third objective lens, and said lens holder resonates, said third objective lens is disposed at a position near the anti-node of vibration of the vibration system as compared with said first objective lens and said second objective lens.

14. The optical pickup device according to claim 13, wherein when assuming that the difference between the stroke center positions of said first and second objective lenses in the focusing direction is ΔST1, and the optical path length in the air equivalent to the difference between said first thickness and said second thickness is L1, which is driven by said actuator, said lens holder holds said first and second objective lenses so as to satisfy

ΔST1<L1.

15. The optical pickup device according to claim 13, wherein when assuming that the difference between the stroke center positions of said second and third objective lenses in the focusing direction is ΔST2, and the optical path length in the air equivalent to the difference between said second thickness and said third thickness is L2, which is driven by said actuator, said lens holder holds said second and third objective lenses so as to satisfy

ΔST2<L2.

16. The optical pickup device according to claim 13, wherein when assuming that the difference between the stroke center positions of said third and first objective lenses in the focusing direction is ΔST3, and the optical path length in the air equivalent to the difference between said third thickness and said first thickness is L3, which is driven by said actuator, said lens holder holds said third and first objective lenses so as to satisfy

ΔST3<L3.

17. The optical pickup device according to claim 13, further comprising:
a mirror, which is a plate shaped or triangular-prism shaped, and disposed so as to face said first objective lens, configured to reflect said first beam so as to enter said first laser beam emitted from said light source into said first objective lens.

18. The optical pickup device according to claim 17, further comprising:
a first dichroic mirror, which is disposed so as to face said second objective lens, configured to transmit said first laser beam, of said first laser beam and said second laser beam, and reflect said second laser beam so as to enter said second laser beam into said second objective lens; and
a second dichroic mirror, which is disposed so as to face said third objective lens, configured to transmit said first and second laser beams, of said first, second, and third laser beams, and reflect said third laser beam so as to enter said third laser beam into said third objective lens.

19. The optical pickup device according to claim 18, further comprising:
a prism including said first dichroic mirror and said second dichroic mirror; and
a wavelength plate, which is provided in said prism, configured to change the polarization states of said first, second, and third laser beams.

20. An optical-disc driving device comprising:
a rotational driving mechanism configured to rotationally drive a disc-shaped first optical recording medium including a first cover layer of first thickness, a disc-shaped second optical recording medium including a second cover layer of second thickness which is thicker than said first thickness, or a disc-shaped third optical recording medium including a third cover layer of third thickness which is thicker than said second thickness;
a first objective lens including a first numerical aperture, which can condense light into said first optical medium;
a second objective lens including a second numerical aperture which is smaller than said first numerical aperture, which can condense light into said second optical recording medium;
a third objective lens including a third numerical aperture which is smaller than said second numerical aperture, which can condense light into said third optical recording medium;
a lens holder configured to hold said first, second, and third objective lenses integrally;
an actuator configured to drive said lens holder; and
a recording/playback processing unit configured to record a signal in said first, second, or third optical recording medium which is rotationally driven by said rotational driving mechanism, or to play a signal recorded therefrom,
wherein when a mechanical vibration system including said first objective lens, second objective lens, third objective lens, and said lens holder resonates, said third objective lens is disposed at a position near the anti-node of vibration of the vibration system as compared with said first objective lens and said second objective lens.

21. An objective lens driving method comprising the steps of:
condensing light into a disc-shaped optical recording medium including a first cover layer of first thickness using a first objective lens including a first numerical aperture;
condensing light into a disc-shaped second optical recording medium including a second cover layer of second thickness which is thicker than said first thickness, using a second objective lens including a second numerical aperture which is smaller than said first numerical aperture;
condensing light into a disc-shaped third optical recording medium including a third cover layer of third thickness which is thicker than said second thickness using a third objective lens having a third numerical aperture which is smaller than said second numerical aperture; and
driving a lens holder configured to integrally hold said first, second, and third objective lenses to record or play a signal,
wherein when a mechanical vibration system including said first objective lens, second objective lens, third objective lens, and said lens holder resonates, said third objective lens is disposed at a position near the anti-node of vibration of the vibration system as compared with said first objective lens and said second objective lens.

* * * * *